US012456421B2

(12) United States Patent
Seo et al.

(10) Patent No.: US 12,456,421 B2
(45) Date of Patent: Oct. 28, 2025

(54) DISPLAY PANEL

(71) Applicant: Samsung Display Co., Ltd., Yongin-Si (KR)

(72) Inventors: Hae-Kwan Seo, Yongin-si (KR); Bon-Seog Gu, Yongin-si (KR); Jiyoun Kim, Yongin-si (KR); Jinyoung Roh, Yongin-si (KR); Jaekeun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/535,968

(22) Filed: Dec. 11, 2023

(65) Prior Publication Data

US 2024/0331626 A1 Oct. 3, 2024

(30) Foreign Application Priority Data

Mar. 28, 2023 (KR) ........................ 10-2023-0040374

(51) Int. Cl.
*G09G 3/3225* (2016.01)

(52) U.S. Cl.
CPC ... *G09G 3/3225* (2013.01); *G09G 2300/0426* (2013.01); *G09G 2300/0452* (2013.01); *G09G 2300/0819* (2013.01); *G09G 2300/0842* (2013.01); *G09G 2320/0257* (2013.01); *G09G 2320/0666* (2013.01); *G09G 2330/021* (2013.01)

(58) Field of Classification Search
CPC ................................................ H10K 59/00–95
See application file for complete search history.

(56) References Cited

U.S. PATENT DOCUMENTS

| | | | | |
|---|---|---|---|---|
| 2019/0164502 | A1* | 5/2019 | Yoon | H10K 59/353 |
| 2020/0043406 | A1* | 2/2020 | Cha | G09G 3/325 |
| 2022/0004037 | A1* | 1/2022 | Cao | H10K 59/123 |
| 2022/0115478 | A1* | 4/2022 | Nam | H10K 59/131 |
| 2022/0320192 | A1 | 10/2022 | Park et al. | |
| 2022/0406854 | A1* | 12/2022 | Choi | G09G 3/3266 |

FOREIGN PATENT DOCUMENTS

| | | | |
|---|---|---|---|
| KR | 10-2021-0052687 | A | 5/2021 |
| KR | 10-2022-0048519 | A | 4/2022 |
| KR | 10-2022-0064463 | A | 5/2022 |
| KR | 10-2023-0146710 | A | 10/2023 |

* cited by examiner

*Primary Examiner* — Sanjiv D. Patel
(74) *Attorney, Agent, or Firm* — Innovation Counsel LLP

(57) ABSTRACT

A display panel is disclosed that includes 2-1 to 2-4 pixel circuit sequentially disposed in a first direction in a second pixel row and 2-1 to 2-4 light emitting area sequentially disposed in the first direction. The 2-1 pixel circuit is connected to a first data line, the 2-2 pixel circuit is connected to a second data line, the 2-3 pixel circuit is connected to a third data line and the 2-4 pixel circuit is connected to a fourth data line. The 2-1 pixel circuit is connected to the 2-3 light emitting area, the 2-2 pixel circuit is connected to the 2-1 light emitting area, the 2-3 pixel circuit is connected to the 2-2 light emitting area and the 2-4 pixel circuit is connected to the 2-4 light emitting area. A color of the 2-1 light emitting area is different from a color of the 2-3 light emitting area.

36 Claims, 17 Drawing Sheets

DISPLAY PANEL

PRIORITY STATEMENT

This application claims priority under 35 U.S.C. § 119 to Korean Patent Application No. 10-2023-0040374, filed on Mar. 28, 2023 in the Korean Intellectual Property Office KIPO, the contents of which are herein incorporated by reference in their entireties.

BACKGROUND

1. Field

Embodiments of the present inventive concept relate to a display panel. More particularly, embodiments of the present inventive concept relate to a display panel capable of reducing a power consumption by eliminating toggling of a red data voltage and a blue data voltage.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

In a display panel in which a red light emitting area and a blue light emitting area are alternately disposed, a red data voltage and a blue data voltage may be applied alternately to data lines. In this case, a power consumption may be great due to toggling of the red data voltage and the blue data voltage.

In addition, the conventional display panel structure to prevent toggling of the red data voltage and the blue data voltage may include additional data lines so that a dead space may increase and a power consumption for driving the additional data lines may occur.

SUMMARY

Embodiments of the present inventive concept may provide a display panel capable of reducing a power consumption.

An embodiment of a display panel includes a 2-1 pixel circuit, a 2-2 pixel circuit, a 2-3 pixel circuit and a 2-4 pixel circuit sequentially disposed in a first direction in a second pixel row and a 2-1 light emitting area, a 2-2 light emitting area, a 2-3 light emitting area and a 2-4 light emitting area sequentially disposed in the first direction. The 2-1 pixel circuit is connected to a first data line, the 2-2 pixel circuit is connected to a second data line, the 2-3 pixel circuit is connected to a third data line and the 2-4 pixel circuit is connected to a fourth data line. The 2-1 pixel circuit is connected to the 2-3 light emitting area, the 2-2 pixel circuit is connected to the 2-1 light emitting area, the 2-3 pixel circuit is connected to the 2-2 light emitting area and the 2-4 pixel circuit is connected to the 2-4 light emitting area. A color of the 2-1 light emitting area is different from a color of the 2-3 light emitting area.

In an embodiment, the display panel may further include a 1-1 pixel circuit, a 1-2 pixel circuit, a 1-3 pixel circuit and a 1-4 pixel circuit sequentially disposed in the first direction in a first pixel row and a 1-1 light emitting area, a 1-2 light emitting area, a 1-3 light emitting area and a 1-4 light emitting area sequentially disposed in the first direction. The 1-1 pixel circuit may be connected to the first data line, the 1-2 pixel circuit may be connected to the second data line, the 1-3 pixel circuit may be connected to the third data line and the 1-4 pixel circuit may be connected to the fourth data line. The 1-1 pixel circuit may be connected to the 1-1 light emitting area, the 1-2 pixel circuit may be connected to the 1-3 light emitting area, the 1-3 pixel circuit may be connected to the 1-2 light emitting area and the 1-4 pixel circuit may be connected to the 1-4 light emitting area. The second pixel row may be adjacent to the first pixel row in a second direction.

In an embodiment, the 1-1 light emitting area may be a first red light emitting area, the 1-2 light emitting area may be a 1-1 green light emitting area, the 1-3 light emitting area may be a first blue light emitting area and the 1-4 light emitting area may be a 1-2 green light emitting area. The 2-1 light emitting area may be a second blue light emitting area, the 2-2 light emitting area may be a 2-1 green light emitting area, the 2-3 light emitting area may be a second red light emitting area and the 2-4 light emitting area may be a 2-2 green light emitting area.

In an embodiment, a red data voltage may be applied to the first data line, a blue data voltage may be applied to the second data line, a first green data voltage may be applied to the third data line and a second green data voltage may be applied to the fourth data line.

In an embodiment, the 1-1 light emitting area may be a first blue light emitting area, the 1-2 light emitting area may be a 1-1 green light emitting area, the 1-3 light emitting area may be a first red light emitting area and the 1-4 light emitting area may be a 1-2 green light emitting area. The 2-1 light emitting area may be a second red light emitting area, the 2-2 light emitting area may be a 2-1 green light emitting area, the 2-3 light emitting area may be a second blue light emitting area and the 2-4 light emitting area may be a 2-2 green light emitting area.

In an embodiment, a blue data voltage may be applied to the first data line, a red data voltage may be applied to the second data line, a first green data voltage may be applied to the third data line and a second green data voltage may be applied to the fourth data line.

In an embodiment, the 1-2 light emitting area and the 1-4 light emitting area may be disposed adjacent to each other in a 1-1 row in the first direction. The 1-1 light emitting area and the 1-3 light emitting area may be disposed adjacent to each other in a 1-2 row in the first direction. The 1-2 row may be disposed under the 1-1 row in the second direction.

In an embodiment, the 1-1 light emitting area may include a first portion overlapping the 1-1 pixel circuit and a second portion not overlapping the 1-1 pixel circuit. The 1-3 light emitting area may include a first portion overlapping the 1-3 pixel circuit and a second portion overlapping the 1-2 pixel circuit.

In an embodiment, the 1-2 light emitting area may include a first portion overlapping the 1-1 pixel circuit, a second portion overlapping the 1-2 pixel circuit and a third portion not overlapping the 1-1 pixel circuit and the 1-2 pixel circuit. The 1-4 light emitting area may include a first portion overlapping the 1-3 pixel circuit, a second portion overlapping the 1-4 pixel circuit and a third portion not overlapping the 1-3 pixel circuit and the 1-4 pixel circuit In an embodiment, a 1-3 connecting line connecting the 1-3 pixel circuit and the 1-2 light emitting area may include a first portion overlapping the 1-2 pixel circuit and a second portion overlapping the 1-3 pixel circuit.

In an embodiment, the 2-1 light emitting area may include a first portion overlapping the 2-1 pixel circuit and a second portion not overlapping the 2-1 pixel circuit. The 2-3 light emitting area may include a first portion overlapping the 2-3 pixel circuit and a second portion overlapping the 2-2 pixel circuit.

In an embodiment, a 2-2 connecting line connecting the 2-2 pixel circuit and the 2-1 light emitting area may include a first portion overlapping the 2-1 pixel circuit and a second portion overlapping the 2-2 pixel circuit.

In an embodiment, a 2-1 connecting line connecting the 2-1 pixel circuit and the 2-3 light emitting area may include a first portion overlapping the 2-1 pixel circuit and a second portion overlapping the 2-2 pixel circuit.

In an embodiment, the 2-2 light emitting area may include a first portion overlapping the 2-1 pixel circuit, a second portion overlapping the 2-2 pixel circuit, a third portion overlapping the 1-1 pixel circuit and a fourth portion overlapping the 1-2 pixel circuit. The 2-4 light emitting area may include a first portion overlapping the 2-3 pixel circuit, a second portion overlapping the 2-4 pixel circuit, a third portion overlapping the 1-3 pixel circuit and a fourth portion overlapping the 1-4 pixel circuit.

In an embodiment, a 2-3 connecting line connecting the 2-3 pixel circuit and the 2-2 light emitting area may include a first portion overlapping the 2-2 pixel circuit and a second portion overlapping the 2-3 pixel circuit.

In an embodiment, the 1-1 light emitting area and the 1-3 light emitting area may be disposed adjacent to each other in a 1-1 row in the first direction. The 1-2 light emitting area and the 1-4 light emitting area may be disposed adjacent to each other in a 1-2 row in the first direction. The 1-2 row may be disposed under the 1-1 row in the second direction.

In an embodiment, the 1-1 light emitting area may include a first portion overlapping the 1-1 pixel circuit and a second portion not overlapping the 1-1 pixel circuit. The 1-3 light emitting area may include a first portion overlapping the 1-2 pixel circuit, a second portion overlapping the 1-3 pixel circuit and a third portion not overlapping the 1-2 pixel circuit and the 1-3 pixel circuit.

In an embodiment, the 1-2 light emitting area may include a first portion overlapping the 1-1 pixel circuit and a second portion overlapping the 1-2 pixel circuit. The 1-4 light emitting area may include a first portion overlapping the 1-3 pixel circuit and a second portion overlapping the 1-4 pixel circuit.

In an embodiment, the 2-1 light emitting area may include a first portion overlapping the 2-1 pixel circuit, a second portion overlapping the 1-1 pixel circuit, a third portion not overlapping the 2-1 pixel circuit and the 1-1 pixel circuit. The 2-3 light emitting area may include a first portion overlapping the 2-2 pixel circuit, a second portion overlapping the 2-3 pixel circuit, a third portion overlapping the 1-2 pixel circuit and a fourth portion overlapping the 1-3 pixel circuit.

In an embodiment, the 2-2 light emitting area may include a first portion overlapping the 2-1 pixel circuit and a second portion overlapping the 2-2 pixel circuit. The 2-4 light emitting area may include a first portion overlapping the 2-3 pixel circuit and a second portion overlapping the 2-4 pixel circuit.

In an embodiment of a display panel according to the present inventive concept, the display panel includes a 2-1 pixel circuit, a 2-2 pixel circuit, a 2-3 pixel circuit and a 2-4 pixel circuit sequentially disposed in a first direction in a second pixel row and a 2-1 light emitting area, a 2-2 light emitting area, a 2-3 light emitting area and a 2-4 light emitting area sequentially disposed in the first direction. The 2-1 pixel circuit is connected to a first data line, the 2-2 pixel circuit is connected to a second data line, the 2-3 pixel circuit is connected to a third data line and the 2-4 pixel circuit is connected to a fourth data line. The 2-1 pixel circuit is connected to the 2-2 light emitting area, the 2-2 pixel circuit is connected to the 2-3 light emitting area, the 2-3 pixel circuit is connected to the 2-4 light emitting area and the 2-4 pixel circuit is connected to the 2-1 light emitting area. A color of the 2-1 light emitting area is different from a color of the 2-3 light emitting area.

In an embodiment, the display panel may further include a 1-1 pixel circuit, a 1-2 pixel circuit, a 1-3 pixel circuit and a 1-4 pixel circuit sequentially disposed in the first direction in a first pixel row and a 1-1 light emitting area, a 1-2 light emitting area, a 1-3 light emitting area and a 1-4 light emitting area sequentially disposed in the first direction. The 1-1 pixel circuit may be connected to the first data line, the 1-2 pixel circuit may be connected to the second data line, the 1-3 pixel circuit may be connected to the third data line and the 1-4 pixel circuit may be connected to the fourth data line. The 1-1 pixel circuit may be connected to the 1-2 light emitting area, the 1-2 pixel circuit may be connected to the 1-1 light emitting area, the 1-3 pixel circuit may be connected to the 1-4 light emitting area and the 1-4 pixel circuit may be connected to the 1-3 light emitting area. The second pixel row may be adjacent to the first pixel row in a second direction.

In an embodiment, the 1-1 light emitting area may be a first red light emitting area, the 1-2 light emitting area may be a 1-1 green light emitting area, the 1-3 light emitting area may be a first blue light emitting area and the 1-4 light emitting area may be a 1-2 green light emitting area. The 1-1 light emitting area may be a first red light emitting area, the 1-2 light emitting area may be a 1-1 green light emitting area, the 1-3 light emitting area may be a first blue light emitting area and the 1-4 light emitting area may be a 1-2 green light emitting area.

In an embodiment, a first green data voltage may be applied to the first data line, a red data voltage may be applied to the second data line, a second green data voltage may be applied to the third data line and a blue data voltage may be applied to the fourth data line.

In an embodiment, the 1-1 light emitting area may be a first blue light emitting area, the 1-2 light emitting area may be a 1-1 green light emitting area, the 1-3 light emitting area may be a first red light emitting area and the 1-4 light emitting area may be a 1-2 green light emitting area. The 2-1 light emitting area may be a second red light emitting area, the 2-2 light emitting area may be a 2-1 green light emitting area, the 2-3 light emitting area may be a second blue light emitting area and the 2-4 light emitting area may be a 2-2 green light emitting area.

In an embodiment, a first green data voltage may be applied to the first data line, a blue data voltage may be applied to the second data line, a second green data voltage may be applied to the third data line and a red data voltage may be applied to the fourth data line.

In an embodiment, the 1-2 light emitting area and the 1-4 light emitting area may be disposed adjacent to each other in a 1-1 row in the first direction. The 1-1 light emitting area and the 1-3 light emitting area may be disposed adjacent to each other in a 1-2 row in the first direction. The 1-2 row may be disposed under the 1-1 row in the second direction.

In an embodiment of a display panel according to the present inventive concept, the display panel includes a 2-1 pixel circuit, a 2-2 pixel circuit, a 2-3 pixel circuit and a 2-4 pixel circuit sequentially disposed in a first direction in a second pixel row and a 2-1 light emitting area, a 2-2 light emitting area, a 2-3 light emitting area and a 2-4 light emitting area sequentially disposed in the first direction. The 2-1 pixel circuit is connected to a first data line, the 2-2 pixel circuit is connected to a second data line, the 2-3 pixel circuit is connected to a third data line and the 2-4 pixel circuit is connected to a fourth data line. The 2-1 pixel circuit is connected to the 2-2 light emitting area, the 2-2 pixel circuit is connected to the 2-3 light emitting area, the 2-3 pixel circuit is connected to the 2-1 light emitting area and the 2-4 pixel circuit is connected to the 2-4 light emitting area. A color of the 2-1 light emitting area is different from a color of the 2-3 light emitting area.

In an embodiment, the display panel may further include a 1-1 pixel circuit, a 1-2 pixel circuit, a 1-3 pixel circuit and a 1-4 pixel circuit sequentially disposed in the first direction in a first pixel row and a 1-1 light emitting area, a 1-2 light emitting area, a 1-3 light emitting area and a 1-4 light emitting area sequentially disposed in the first direction. The 1-1 pixel circuit may be connected to the first data line, the 1-2 pixel circuit may be connected to the second data line, the 1-3 pixel circuit may be connected to the third data line and the 1-4 pixel circuit may be connected to the fourth data line. The 1-1 pixel circuit may be connected to the 1-2 light emitting area, the 1-2 pixel circuit may be connected to the 1-1 light emitting area, the 1-3 pixel circuit may be connected to the 1-3 light emitting area and the 1-4 pixel circuit may be connected to the 1-4 light emitting area. The second pixel row may be adjacent to the first pixel row in a second direction.

In an embodiment, the 1-1 light emitting area may be a first red light emitting area, the 1-2 light emitting area may be a 1-1 green light emitting area, the 1-3 light emitting area may be a first blue light emitting area and the 1-4 light emitting area may be a 1-2 green light emitting area. The 2-1 light emitting area may be a second blue light emitting area, the 2-2 light emitting area may be a 2-1 green light emitting area, the 2-3 light emitting area may be a second red light emitting area and the 2-4 light emitting area may be a 2-2 green light emitting area.

In an embodiment, a first green data voltage may be applied to the first data line, a red data voltage may be applied to the second data line, a blue data voltage may be applied to the third data line and a second green data voltage may be applied to the fourth data line.

In an embodiment, the 1-1 light emitting area may be a first blue light emitting area, the 1-2 light emitting area may be a 1-1 green light emitting area, the 1-3 light emitting area may be a first red light emitting area and the 1-4 light emitting area may be a 1-2 green light emitting area. The 2-1 light emitting area may be a second red light emitting area, the 2-2 light emitting area may be a 2-1 green light emitting area, the 2-3 light emitting area may be a second blue light emitting area and the 2-4 light emitting area may be a 2-2 green light emitting area.

In an embodiment, a first green data voltage may be applied to the first data line, a blue data voltage may be applied to the second data line, a red data voltage may be applied to the third data line and a second green data voltage may be applied to the fourth data line.

In an embodiment, the 1-2 light emitting area and the 1-4 light emitting area may be disposed adjacent to each other in a 1-1 row in the first direction. The 1-1 light emitting area and the 1-3 light emitting area may be disposed adjacent to each other in a 1-2 row in the first direction. The 1-2 row may be disposed under the 1-1 row in the second direction.

An embodiment of a display panel includes a first pixel circuit, a second pixel circuit adjacent to the first pixel circuit in a first direction, a third pixel circuit adjacent to the first pixel circuit in a second direction, a fourth pixel circuit adjacent to the third pixel circuit in the first direction, a first light emitting area overlapping the first pixel circuit and connected to the first pixel circuit, a second light emitting area overlapping the second pixel circuit and connected to the second pixel circuit, a third light emitting area overlapping the third pixel circuit and connected to the fourth pixel circuit and a fourth light emitting area overlapping the fourth pixel circuit and connected to the third pixel circuit. The first pixel circuit and the third pixel circuit are connected to a first data line and the second pixel circuit and the fourth pixel circuit are connected to a second data line. The first light emitting area and the fourth light emitting area represent a first color and the second light emitting area and the third light emitting area represent a second color different from the first color In an embodiment, the display panel may further include a fifth light emitting area disposed between the first light emitting area and the second light emitting area in the first direction and a sixth light emitting area disposed between the third light emitting area and the fourth light emitting area in the first direction. The fifth light emitting area and the sixth light emitting area represent a third color different from the first color and different from the second color.

According to the above explained display panel, in the display panel in which the red light emitting area and the blue light emitting area are alternately disposed, one data line outputs a data voltage of only one color without toggling the red data voltage and the blue data voltage so that the power consumption of the display apparatus may be reduced.

The conventional display panel structure to prevent toggling of the red data voltage and the blue data voltage may include additional data lines. In contrast, the display panel structure of the present inventive concept may not include the additional data lines and may have a cross connection between the pixel circuit and the light emitting area which are spaced apart from each other so that the power consumption may not occur for driving the additional data lines and the dead space may be reduced.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
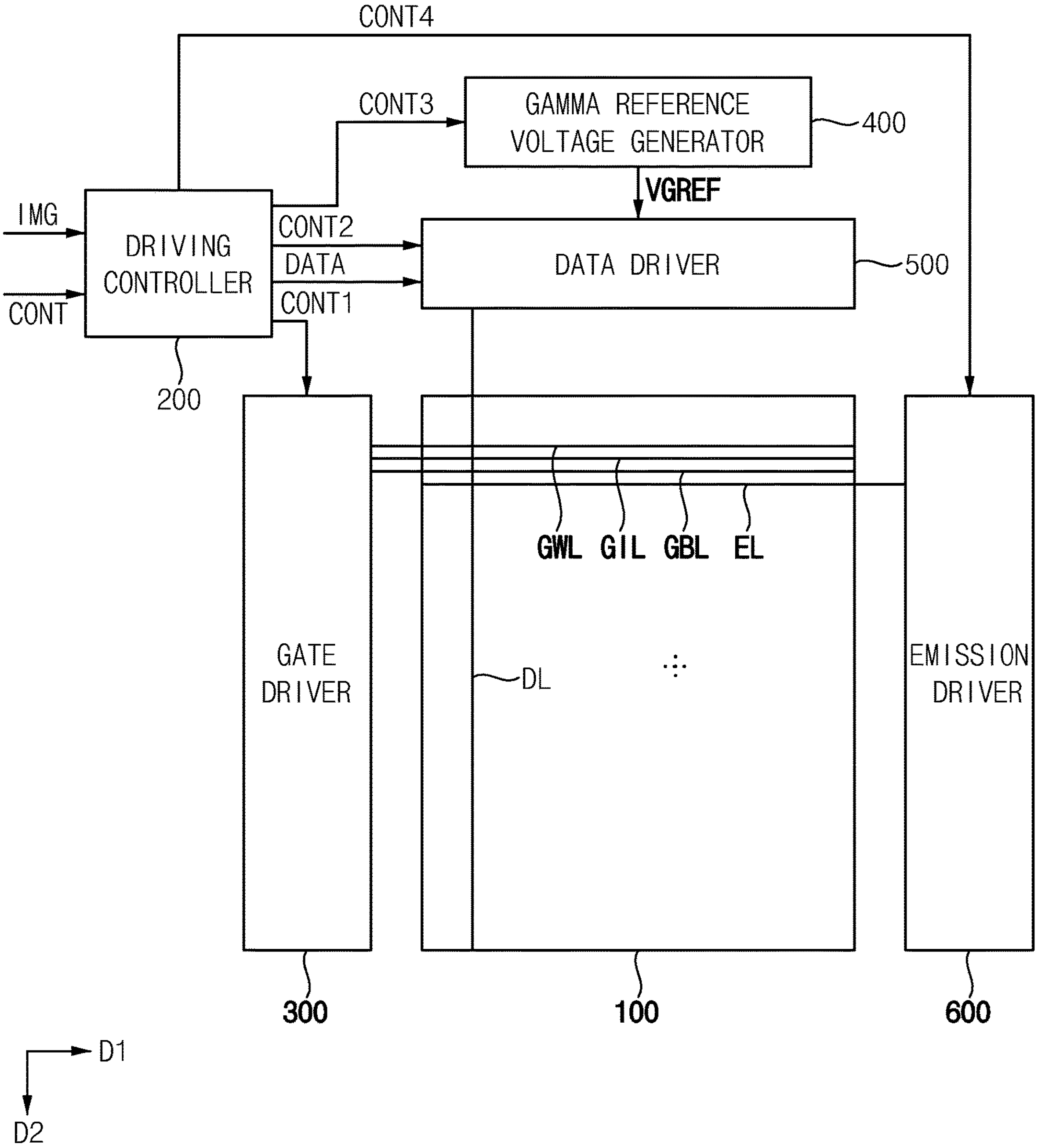
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

The display panel 100 has a display region on which an image is displayed and a peripheral region adjacent to the display region.

The display panel 100 includes a plurality of gate lines GWL, GIL and GBL, a plurality of data lines DL, a plurality of emission lines EL and a plurality of pixel circuits electrically connected to the gate lines GWL, GIL and GBL, the data lines DL and the emission lines EL. The gate lines GWL, GIL and GBL may extend in a first direction D1, the data lines DL may extend in a second direction D2 crossing the first direction D1 and the emission lines EL may extend in the first direction D1.

The driving controller 200 receives input image data IMG and an input control signal CONT from an external apparatus (e.g. a processor). For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 may generate the first control signal CONT1 for controlling an operation of the gate driver 300 based on the input control signal CONT, and may output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and may output the third control signal CONT3 to the gamma reference voltage generator 400.

The driving controller 200 may generate the fourth control signal CONT4 for controlling an operation of the emission driver 600 based on the input control signal CONT, and may output the fourth control signal CONT4 to the emission driver 600.

The gate driver 300 generates gate signals driving the gate lines GWL, GIL and GBL in response to the first control signal CONT1 received from the driving controller 200. The gate driver 300 may sequentially output the gate signals to the gate lines GWL, GIL and GBL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500.

In an embodiment, the gamma reference voltage generator 400 may be disposed in the driving controller 200, or in the data driver 500.

The data driver 500 may receive the second control signal CONT2 and the data signal DATA from the driving controller 200, and may receive the gamma reference voltages VGREF from the gamma reference voltage generator 400. The data driver 500 may convert the data signal DATA into data voltages having an analog type using the gamma reference voltages VGREF. The data driver 500 may output the data voltages to the data lines DL.

The emission driver 600 may generate emission signals to drive the emission lines EL in response to the fourth control signal CONT4 received from the driving controller 200. The emission driver 600 may output the emission signals to the emission lines EL.

Although the gate driver 300 is disposed at a first side of the display panel 100 and the emission driver 600 is disposed at a second side of the display panel 100 opposite to the first side in FIG. 1 for convenience of explanation, the present inventive concept may not be limited thereto. For example, both of the gate driver 300 and the emission driver 600 may be disposed at the first side of the display panel 100. For example, the gate driver 300 and the emission driver 600 may be integrally formed.

Figure 2:
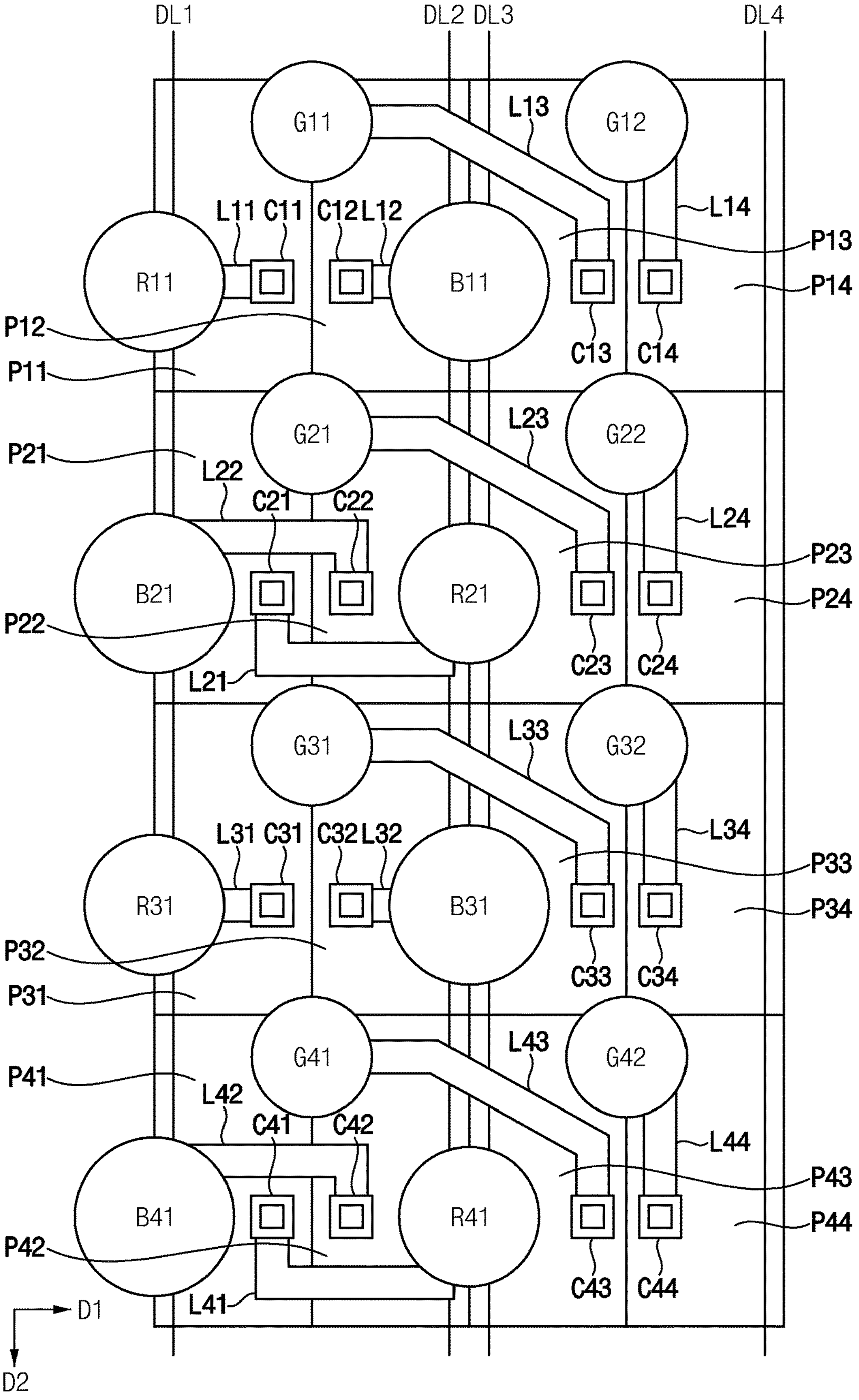
FIG. 2 is a diagram illustrating a pixel circuit and a light emitting area of a display panel of FIG. 1.
Figure 3:
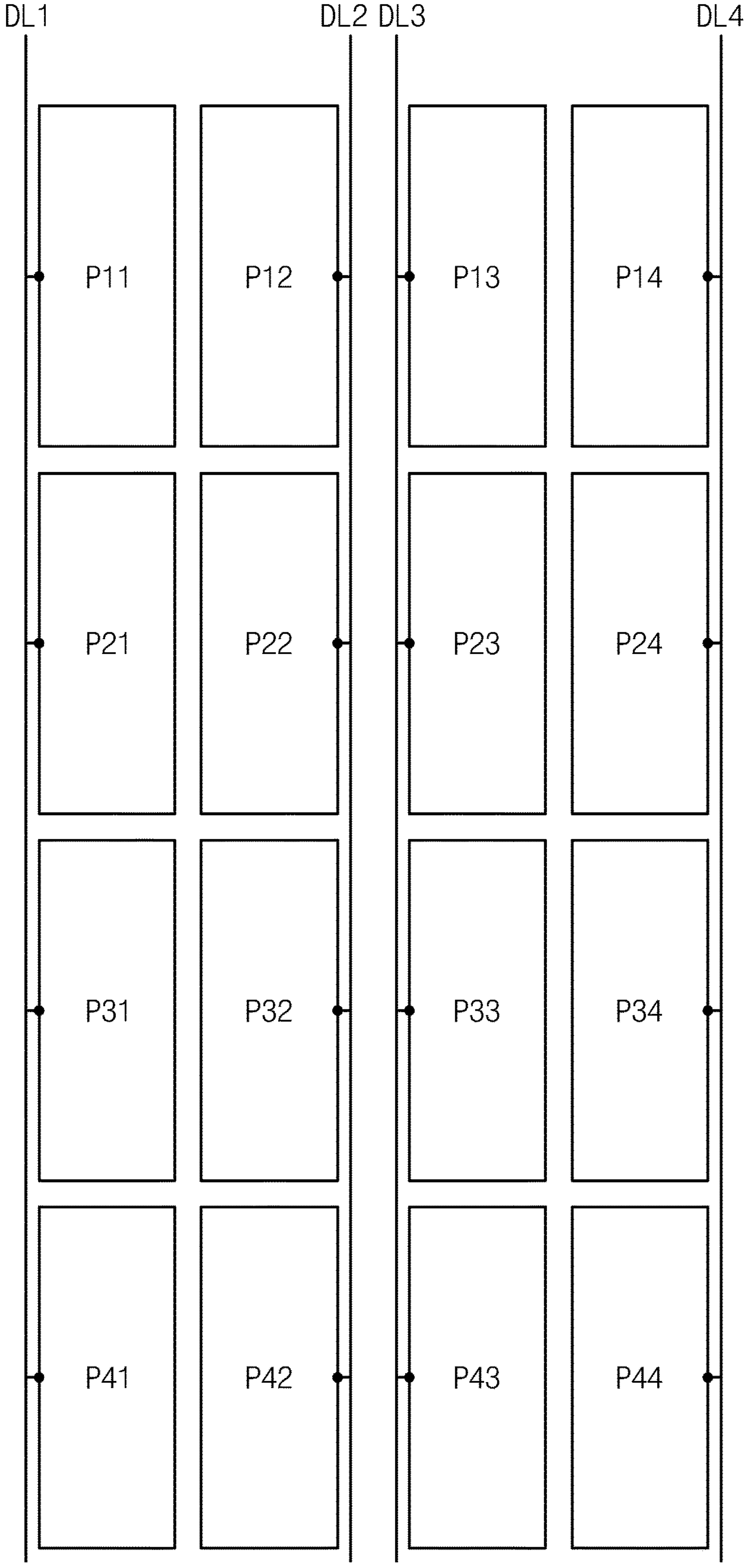
FIG. 3 is a diagram illustrating the pixel circuit of the display panel of FIG. 1.
Figure 4:
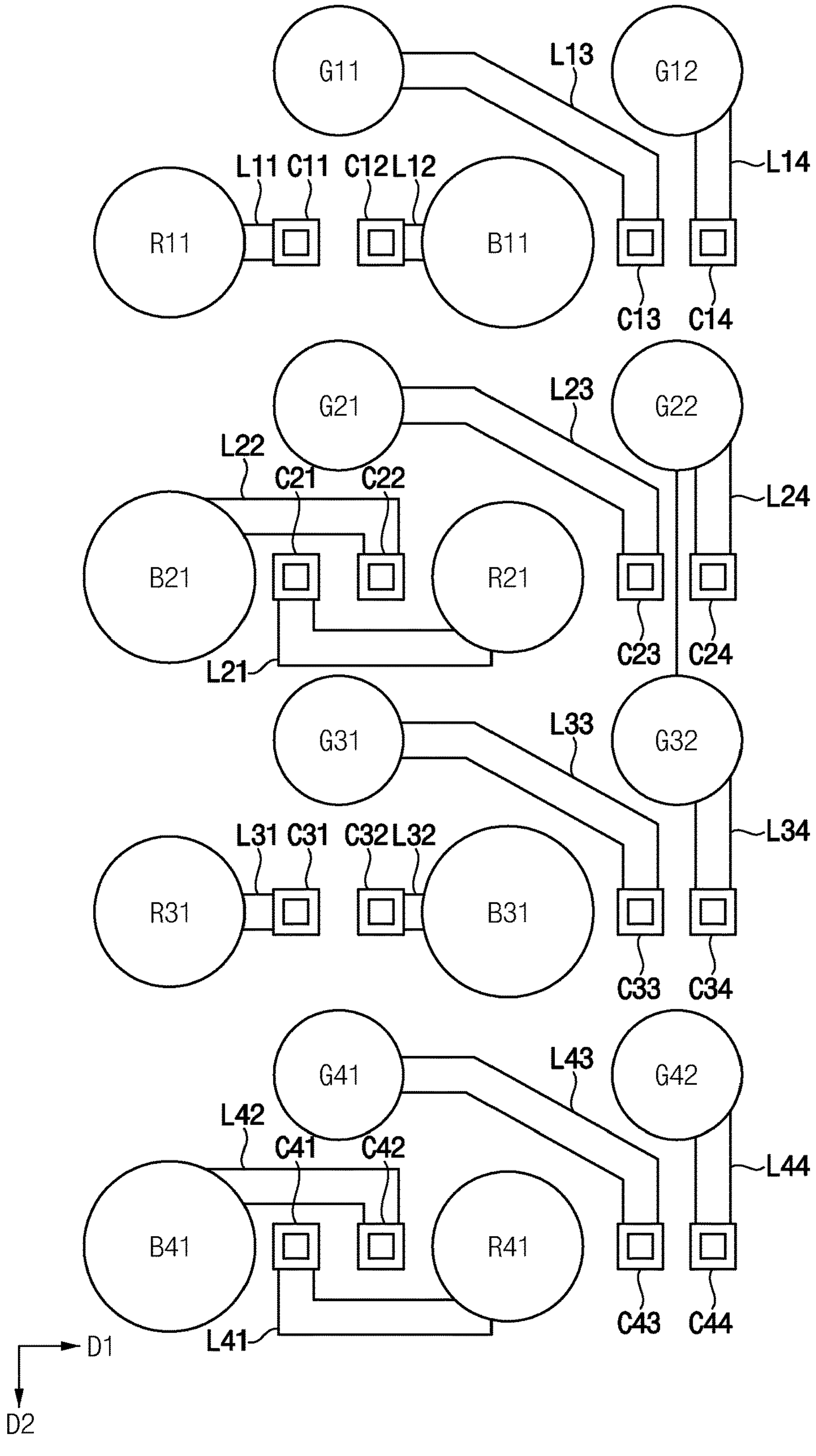
FIG. 4 is a diagram illustrating the light emitting area of the display panel of FIG. 1.

FIG. 2 is a diagram illustrating a pixel circuit and a light emitting area of the display panel 100 of FIG. 1. FIG. 3 is a diagram illustrating the pixel circuit of the display panel 100 of FIG. 1. FIG. 4 is a diagram illustrating the light emitting area of the display panel 100 of FIG. 1.

Referring to FIGS. 1 to 4, the display panel 100 includes a 1-1 pixel circuit P11, a 1-2 pixel circuit P12, a 1-3 pixel circuit P13 and a 1-4 pixel circuit P14 sequentially disposed in the first direction D1 in a first pixel row.

The display panel 100 may further include a 2-1 pixel circuit P21, a 2-2 pixel circuit P22, a 2-3 pixel circuit P23 and a 2-4 pixel circuit P24 sequentially disposed in the first direction D1 in a second pixel row adjacent to the first pixel row in the second direction D2.

The display panel 100 may further include a 3-1 pixel circuit P31, a 3-2 pixel circuit P32, a 3-3 pixel circuit P33 and a 3-4 pixel circuit P34 sequentially disposed in the first direction D1 in a third pixel row adjacent to the second pixel row in the second direction D2.

The display panel 100 may further include a 4-1 pixel circuit P41, a 4-2 pixel circuit P42, a 4-3 pixel circuit P43 and a 4-4 pixel circuit P44 sequentially disposed in the first direction D1 in a fourth pixel row adjacent to the third pixel row in the second direction D2.

Herein, the first pixel row may not be limited to an uppermost pixel row or a lowermost pixel row in the display panel 100. Accordingly, the first to fourth pixel rows may be interpreted as N-th to (N+4)-th pixel rows (N is a positive integer).

Similarly, a first pixel column including the 1-1 pixel circuit P11, the 2-1 pixel circuit P21, the 3-1 pixel circuit P31 and the 4-1 pixel circuit P41 may not be limited to a leftmost pixel column or a rightmost pixel column in the display panel 100. Accordingly, the first pixel column may be interpreted as a M-th pixel column (M is a positive integer).

The 1-1 pixel circuit P11 may be connected to a first data line DL1, the 1-2 pixel circuit P12 may be connected to a second data line DL2, the 1-3 pixel circuit P13 may be connected to a third data line DL3 and the 1-4 pixel circuit P14 may be connected to a fourth data line DL4.

The 2-1 pixel circuit P21 may be connected to the first data line DL1, the 2-2 pixel circuit P22 may be connected to the second data line DL2, the 2-3 pixel circuit P23 may be connected to the third data line DL3 and the 2-4 pixel circuit P24 may be connected to the fourth data line DL4.

Similarly, the 3-1 pixel circuit P31 and the 4-1 pixel circuit P41 may be connected to the first data line DL1, the 3-2 pixel circuit P32 and the 4-2 pixel circuit P42 may be connected to the second data line DL2, the 3-3 pixel circuit P33 and the 4-3 pixel circuit P43 may be connected to the third data line DL3 and the 3-4 pixel circuit P34 and the 4-4 pixel circuit P44 may be connected to the fourth data line DL4.

In the present embodiment, an area of the pixel circuit may be defined as a rectangle. As shown in FIG. 2, the area of the pixel circuit may be defined to include an area where the data line is disposed between the pixel circuits so that the areas of the adjacent pixel circuits may contact each other. Alternatively, as shown in FIG. 3, the area of the pixel circuit may be defined to exclude the area where the data line is disposed between the pixel circuits.

The display panel 100 may include a 1-1 light emitting area R11, a 1-2 light emitting area G11, a 1-3 light emitting area B11 and a 1-4 light emitting area G12 sequentially disposed in the first direction D1.

The display panel 100 may further include a 2-1 light emitting area B21, a 2-2 light emitting area G21, a 2-3 light emitting area R21 and a 2-4 light emitting area G22 sequentially disposed in the first direction D1 and adjacent to the 1-1 to 1-4 light emitting areas R11, G11, B11 and G12 in the second direction D2.

The display panel 100 may further include a 3-1 light emitting area R31, a 3-2 light emitting area G31, a 3-3 light emitting area B31 and a 3-4 light emitting area G32 sequentially disposed in the first direction D1 and adjacent to the 2-1 to 2-4 light emitting areas B21, G21, R21 and G22 in the second direction D2.

The display panel 100 may further include a 4-1 light emitting area B41, a 4-2 light emitting area G41, a 4-3 light emitting area R41 and a 4-4 light emitting area G42 sequentially disposed in the first direction D1 and adjacent to the 3-1 to 3-4 light emitting areas R31, G31, B31 and G32 in the second direction D2.

In the present embodiment, the 1-1 pixel circuit P11 may be connected to the 1-1 light emitting area R11, the 1-2 pixel circuit P12 may be connected to the 1-3 light emitting area B11, the 1-3 pixel circuit P13 may be connected to the 1-2 light emitting area G11 and the 1-4 pixel circuit P14 may be connected to the 1-4 light emitting area G12.

In the present embodiment, the 2-1 pixel circuit P21 may be connected to the 2-3 light emitting area R21, the 2-2 pixel circuit P22 may be connected to the 2-1 light emitting area B21, the 2-3 pixel circuit P23 may be connected to the 2-2 light emitting area G21 and the 2-4 pixel circuit P24 may be connected to the 2-4 light emitting area G22.

The 1-1 light emitting area R11 may be a first red light emitting area, the 1-2 light emitting area G11 may be a 1-1 green light emitting area, the 1-3 light emitting area B11 may be a first blue light emitting area and the 1-4 light emitting area G12 may be a 1-2 green light emitting area.

In addition, the 2-1 light emitting area B21 may be a second blue light emitting area, the 2-2 light emitting area G21 may be a 2-1 green light emitting area, the 2-3 light emitting area R21 may be a second red light emitting area and the 2-4 light emitting area G22 may be a 2-2 green light emitting area.

The 1-1 pixel circuit P11 and the 2-1 pixel circuit P21 connected to the first data line DL1 are connected to the 1-1 light emitting area R11 and the 2-3 light emitting area R21 which are the red light emitting areas so that a red data voltage may be applied to the first data line DL1.

The 1-2 pixel circuit P12 and the 2-2 pixel circuit P22 connected to the second data line DL2 are connected to the 1-3 light emitting area B11 and the 2-1 light emitting area B21 which are the blue light emitting areas so that a blue data voltage may be applied to the second data line DL2.

The 1-3 pixel circuit P13 and the 2-3 pixel circuit P23 connected to the third data line DL3 are connected to the 1-2 light emitting area G11 and the 2-2 light emitting area G21 which are the green light emitting areas so that a first green data voltage may be applied to the third data line DL3.

The 1-4 pixel circuit P14 and the 2-4 pixel circuit P24 connected to the fourth data line DL4 are connected to the 1-4 light emitting area G12 and the 2-4 light emitting area G22 which are the green light emitting areas so that a second green data voltage may be applied to the fourth data line DL4.

In the display panel 100 in which the red light emitting area and the blue light emitting area are alternately disposed, one data line (e.g. each of the first data line DL1 and the second data line DL2) outputs the data voltage of only one color without toggling the red data voltage and the blue data voltage so that the power consumption of the display apparatus may be reduced.

In the present embodiment, the 1-2 light emitting area G11 and the 1-4 light emitting area G12 are disposed adjacent to each other in the first direction D1 in a 1-1 row and the 1-1 light emitting area R11 and the 1-3 light emitting area B11 are disposed adjacent to each other in the first direction D1 in a 1-2 row. Herein, the 1-2 row may be disposed under the 1-1 row in the second direction D2. The 1-2 row may be disposed adjacent to the 1-1 row in the second direction D2. The light emitting areas G11 and G12 in the 1-1 row and the light emitting areas R11 and B11 in the 1-2 row may correspond to one pixel row (the first pixel row). The light emitting areas G11 and G12 in the 1-1 row and the light emitting areas R11 and B11 in the 1-2 row may form a first light emitting row corresponding to one pixel row (the first pixel row).

As shown in FIG. 2, for example, the 1-1 light emitting area R11 may include a first portion overlapping the 1-1 pixel circuit P11 and a second portion not overlapping the 1-1 pixel circuit P11. For example, the 1-1 light emitting area R11 may include a portion which extends from the 1-1 pixel circuit P11 to an outside of a left side of the 1-1 pixel circuit P11 (e.g. to a left pixel column).

For example, the 1-3 light emitting area B11 may include a first portion overlapping the 1-3 pixel circuit P13 and a second portion overlapping the 1-2 pixel circuit P12.

For example, the 1-2 light emitting area G11 may include a first portion overlapping the 1-1 pixel circuit P11, a second portion overlapping the 1-2 pixel circuit P12 and a third portion not overlapping the 1-1 pixel circuit P11 and the 1-2 pixel circuit P12. For example, the 1-2 light emitting area G11 may include a portion which extends from the 1-1 pixel circuit P11 and the 1-2 pixel circuit P12 to an outside of an upper side of the 1-1 pixel circuit P11 and an upper side of the 1-2 pixel circuit P12 (e.g. to an upper pixel row).

For example, the 1-4 light emitting area G12 may include a first portion overlapping the 1-3 pixel circuit P13, a second portion overlapping the 1-4 pixel circuit P14 and a third portion not overlapping the 1-3 pixel circuit P13 and the 1-4 pixel circuit P14. For example, the 1-4 light emitting area G12 may include a portion which extends from the 1-3 pixel circuit P13 and the 1-4 pixel circuit P14 to an outside of an upper side of the 1-3 pixel circuit P13 and an upper side of the 1-4 pixel circuit P14 (e.g. to an upper pixel row).

For example, the 1-1 pixel circuit P11 may include a 1-1 contact portion C11. The 1-1 pixel circuit P11 and the 1-1 light emitting area R11 may be connected to each other through the 1-1 contact portion C11 and a 1-1 connecting line L11. The 1-1 contact portion C11 may be integrally formed with an anode electrode of a light emitting element of the 1-1 pixel circuit P11. For example, the 1-1 contact portion C11 may be an extended portion of the anode electrode of the light emitting element of the 1-1 pixel circuit P11 so that the 1-1 contact portion C11 may be referred to as the anode electrode of the light emitting element of the 1-1 pixel circuit P11. The 1-1 connecting line L11 may overlap the 1-1 pixel circuit P11.

For example, the 1-2 pixel circuit P12 may include a 1-2 contact portion C12. The 1-2 pixel circuit P12 and the 1-3 light emitting area B11 may be connected to each other through the 1-2 contact portion C12 and a 1-2 connecting line L12. The 1-2 contact portion C12 may be integrally formed with an anode electrode of a light emitting element of the 1-2 pixel circuit P12. For example, the 1-2 contact portion C12 may be an extended portion of the anode electrode of the light emitting element of the 1-2 pixel circuit P12 so that the 1-2 contact portion C12 may be referred to as the anode electrode of the light emitting element of the 1-2 pixel circuit P12. The 1-2 connecting line L12 may overlap the 1-2 pixel circuit P12.

For example, the 1-3 pixel circuit P13 may include a 1-3 contact portion C13. The 1-3 pixel circuit P13 and the 1-2 light emitting area G11 may be connected to each other through the 1-3 contact portion C13 and a 1-3 connecting line L13. The 1-3 contact portion C13 may be integrally formed with an anode electrode of a light emitting element of the 1-3 pixel circuit P13. For example, the 1-3 contact portion C13 may be an extended portion of the anode electrode of the light emitting element of the 1-3 pixel circuit P13 so that the 1-3 contact portion C13 may be referred to as the anode electrode of the light emitting element of the 1-3 pixel circuit P13. The 1-3 connecting line L13 may overlap the 1-2 pixel circuit P12 and the 1-3 pixel circuit P13.

For example, the 1-4 pixel circuit P14 may include a 1-4 contact portion C14. The 1-4 pixel circuit P14 and the 1-4 light emitting area G12 may be connected to each other through the 1-4 contact portion C14 and a 1-4 connecting line L14. The 1-4 contact portion C14 may be integrally formed with an anode electrode of a light emitting element of the 1-4 pixel circuit P14. For example, the 1-4 contact portion C14 may be an extended portion of the anode electrode of the light emitting element of the 1-4 pixel circuit P14 so that the 1-4 contact portion C14 may be referred to as the anode electrode of the light emitting element of the 1-4 pixel circuit P14. The 1-4 connecting line L14 may overlap the 1-4 pixel circuit P14.

As shown in FIG. 2, for example, the 2-1 light emitting area B21 may include a first portion overlapping the 2-1 pixel circuit P21 and a second portion not overlapping the 2-1 pixel circuit P21. For example, the 2-1 light emitting area B21 may include a portion which extends from the 2-1 pixel circuit P21 to an outside of a left side of the 2-1 pixel circuit P21 (e.g. to a left pixel column).

For example, the 2-3 light emitting area R21 may include a first portion overlapping the 2-3 pixel circuit P23 and a second portion overlapping the 2-2 pixel circuit P22.

For example, the 2-2 light emitting area G21 may include a first portion overlapping the 2-1 pixel circuit P21, a second portion overlapping the 2-2 pixel circuit P22, a third portion overlapping the 1-1 pixel circuit P11 and a fourth portion overlapping the 1-2 pixel circuit P12. For example, the 2-2 light emitting area G21 may extend from the 2-1 pixel circuit P21 and the 2-2 pixel circuit P22 to an outside of an upper side of the 2-1 pixel circuit P21 and an upper side of the 2-2 pixel circuit P22 (e.g. to an upper pixel row) and may partially overlap the 1-1 pixel circuit P11 and the 1-2 pixel circuit P12 of the first pixel row.

For example, the 2-4 light emitting area G22 may include a first portion overlapping the 2-3 pixel circuit P23, a second portion overlapping the 2-4 pixel circuit P24, a third portion overlapping the 1-3 pixel circuit P13 and a fourth portion overlapping the 1-4 pixel circuit P14. For example, the 2-4 light emitting area G22 may extend from the 2-3 pixel circuit P23 and the 2-4 pixel circuit P24 to an outside of an upper side of the 2-3 pixel circuit P23 and an upper side of the 2-4 pixel circuit P24 (e.g. to an upper pixel row) and may partially overlap the 1-3 pixel circuit P13 and the 1-4 pixel circuit P14 of the first pixel row.

For example, the 2-1 pixel circuit P21 may include a 2-1 contact portion C21. The 2-1 pixel circuit P21 and the 2-3 light emitting area R21 may be connected to each other through the 2-1 contact portion C21 and a 2-1 connecting line L21. The 2-1 contact portion C21 may be integrally formed with an anode electrode of a light emitting element of the 2-1 pixel circuit P21. For example, the 2-1 contact portion C21 may be an extended portion of the anode electrode of the light emitting element of the 2-1 pixel circuit P21 so that the 2-1 contact portion C21 may be referred to as the anode electrode of the light emitting element of the 2-1 pixel circuit P21. The 2-1 connecting line L21 may include a first portion overlapping the 2-1 pixel circuit P21 and a second portion overlapping the 2-2 pixel circuit P22.

For example, the 2-2 pixel circuit P22 may include a 2-2 contact portion C22. The 2-2 pixel circuit P22 and the 2-1 light emitting area B21 may be connected to each other through the 2-2 contact portion C22 and a 2-2 connecting line L22. The 2-2 contact portion C22 may be integrally formed with an anode electrode of a light emitting element of the 2-2 pixel circuit P22. For example, the 2-2 contact portion C22 may be an extended portion of the anode electrode of the light emitting element of the 2-2 pixel circuit P22 so that the 2-2 contact portion C22 may be referred to as the anode electrode of the light emitting element of the 2-2 pixel circuit P22. The 2-2 connecting line L22 may include a first portion overlapping the 2-1 pixel circuit P21 and a second portion overlapping the 2-2 pixel circuit P22.

In the second pixel row, the pixel circuits and the light emitting areas which are spaced apart from each other may be interconnected through the 2-1 connecting line L21 and the 2-2 connecting line L22. For example, the 2-1 pixel circuit P21 receiving the red data voltage through the first data line DL1 may be connected to the 2-3 light emitting area R21 through the 2-1 connecting line L21. For example, the 2-2 pixel circuit P22 receiving the blue data voltage through the second data line DL2 may be connected to the 2-1 light emitting area B21 through the 2-2 connecting line L22.

For example, the 2-3 pixel circuit P23 may include a 2-3 contact portion C23. The 2-3 pixel circuit P23 and the 2-2 light emitting area G21 may be connected to each other through the 2-3 contact portion C23 and a 2-3 connecting line L23. The 2-3 contact portion C23 may be integrally formed with an anode electrode of a light emitting element of the 2-3 pixel circuit P23. For example, the 2-3 contact portion C23 may be an extended portion of the anode electrode of the light emitting element of the 2-3 pixel circuit P23 so that the 2-3 contact portion C23 may be referred to as the anode electrode of the light emitting element of the 2-3 pixel circuit P23. The 2-3 connecting line L23 may overlap the 2-2 pixel circuit P22 and the 2-3 pixel circuit P23.

For example, the 2-4 pixel circuit P24 may include a 2-4 contact portion C24. The 2-4 pixel circuit P24 and the 2-4 light emitting area G22 may be connected to each other through the 2-4 contact portion C24 and a 2-4 connecting line L24. The 2-4 contact portion C24 may be integrally formed with an anode electrode of a light emitting element of the 2-4 pixel circuit P24. For example, the 2-4 contact portion C24 may be an extended portion of the anode electrode of the light emitting element of the 2-4 pixel circuit P24 so that the 2-4 contact portion C24 may be referred to as the anode electrode of the light emitting element of the 2-4 pixel circuit P24. The 2-4 connecting line L24 may overlap the 2-4 pixel circuit P24.

In the present embodiment, the display panel may include a repetitive unit structure including eight pixel circuits in two rows and four columns and eight light emitting areas corresponding to the eight pixel circuits. For example, a unit structure including the pixel circuits P11, P12, P13 and P14 in the first pixel row, the pixel circuits P21, P22, P23 and P24 in the second pixel row and the light emitting areas R11, G11, B11, G12, B21, G21, R21 and G22 corresponding to the pixel circuits P11, P12, P13, P14, P21, P22, P23 and P24 may be disposed repetitively along a row direction and a column direction.

Thus, a detailed explanation for a structure including pixel circuits P31, P32, P33 and P34 in the third pixel row, pixel circuits P41, P42, P43 and P44 in the fourth pixel row and the light emitting areas R31, G31, B31, G32, B41, G41, R41 and G42 corresponding to the pixel circuits P31, P32, P33, P34, P41, P42, P43 and P44 may be omitted. In addition, a detailed explanation for connection structures between the pixel circuits P31, P32, P33, P34, P41, P42, P43 and P44 and the light emitting areas R31, G31, B31, G32, B41, G41, R41 and G42 corresponding thereto may be omitted.

In the present embodiment, the 1-3 light emitting area B11, the 2-2 light emitting area G21, the 2-3 light emitting area R21 and the 2-4 light emitting area G22 may be disposed in a diamond shape and may be referred to as a diamond pixel structure.

For example, each of the light emitting areas may have a round shape. For example, each of the light emitting areas may have a circular shape.

For example, a size of one of the blue light emitting areas B11, B21, B31 and B41 may be greater than a size of one of the red light emitting areas R11, R21, R31 and R41. For example, the size of one of the red light emitting areas R11, R21, R31 and R41 may be greater than a size of one of the green light emitting areas G11, G12, G21, G22, G31, G32, G41 and G42.

Figure 5:
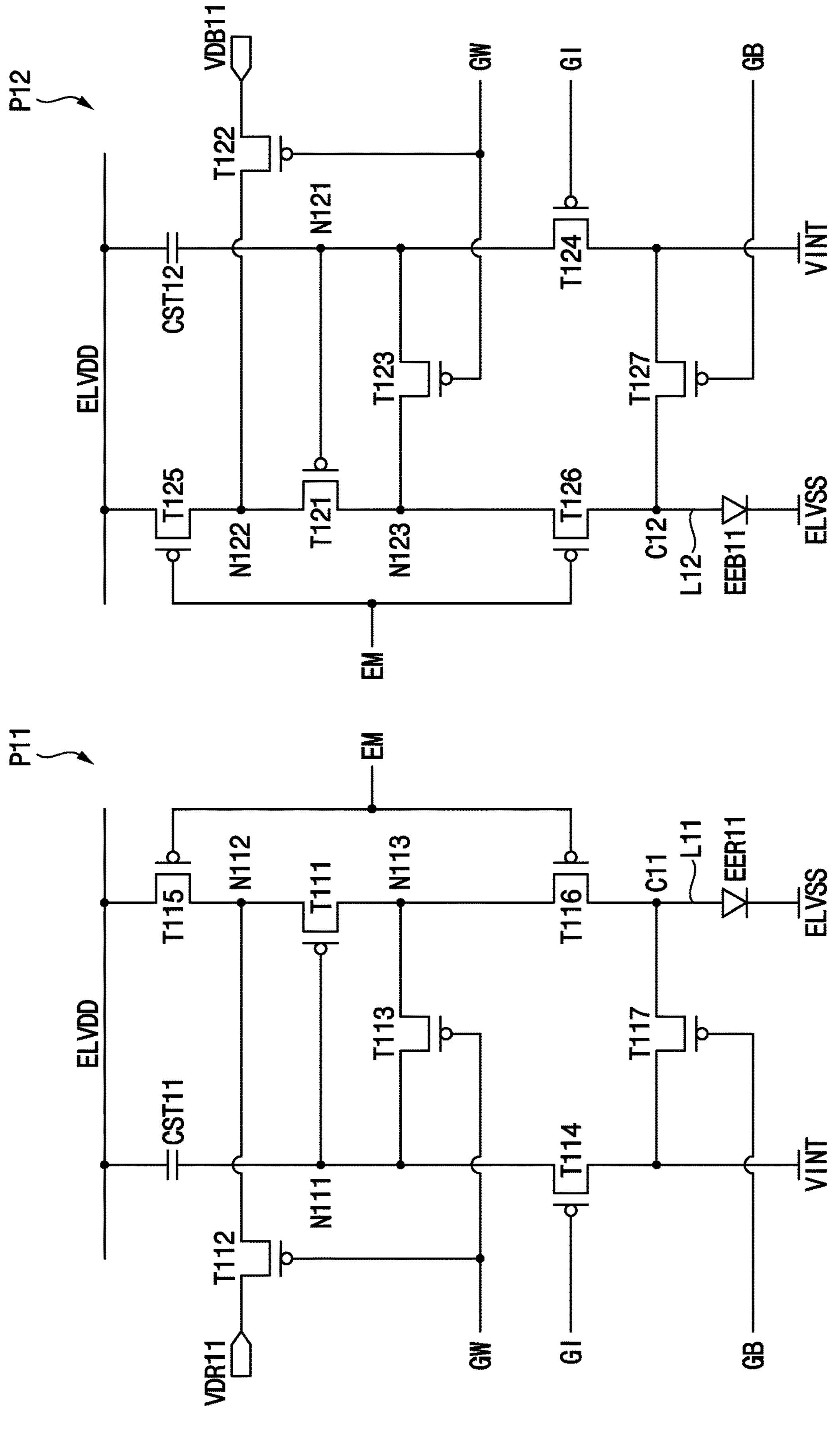
FIG. 5 is a circuit diagram illustrating a 1-1 pixel circuit and a 1-2 pixel circuit of FIG. 3.
Figure 6:
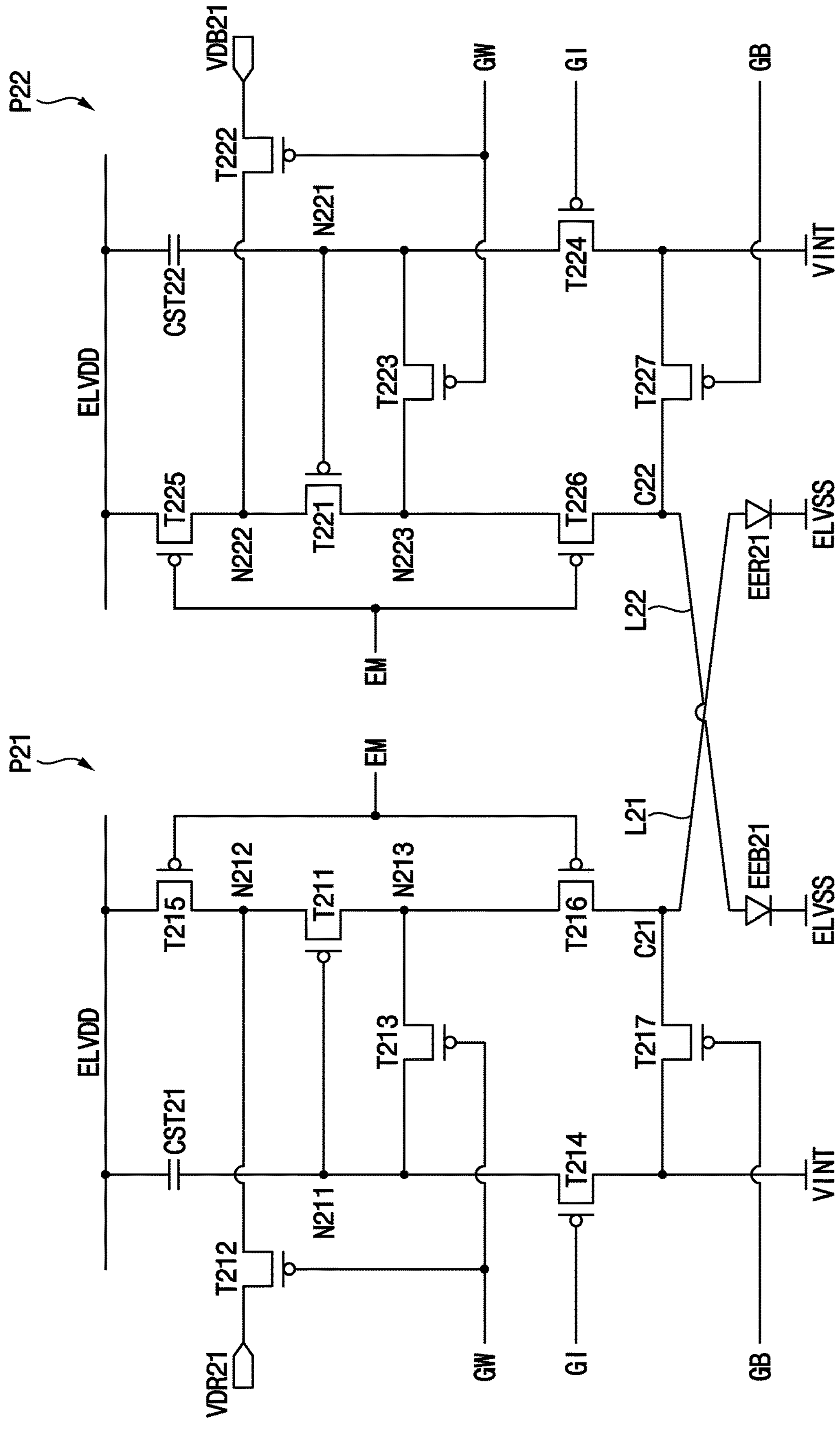
FIG. 6 is a circuit diagram illustrating a 2-1 pixel circuit and a 2-2 pixel circuit of FIG. 3.

FIG. 5 is a circuit diagram illustrating the 1-1 pixel circuit P11 and the 1-2 pixel circuit P12 of FIG. 3. FIG. 6 is a circuit diagram illustrating the 2-1 pixel circuit P21 and the 2-2 pixel circuit P22 of FIG. 3.

The 1-1 pixel circuit P11 of FIG. 5 may be connected to the 1-1 light emitting area R11 right adjacent to the 1-1 pixel circuit P11 through the 1-1 connecting line L11 and the 1-2 pixel circuit P12 of FIG. 5 may be connected to the 1-3 light emitting area B11 right adjacent to the 1-2 pixel circuit P12 through the 1-2 connecting line L12 so that the display panel in FIG. 5 does not include a cross connection between the pixel circuit and the light emitting area which are spaced apart from each other.

In contrast, the 2-1 pixel circuit P21 of FIG. 6 may be connected to the 2-3 light emitting area R21 through the 2-1 connecting line L21 and the 2-2 pixel circuit P22 of FIG. 6 may be connected to the 2-1 light emitting area B21 through the 2-2 connecting line L22 so that the display panel in FIG. 6 includes a cross connection between the pixel circuit and the light emitting area which are spaced apart from each other.

Each of the 1-1 pixel circuit P11, the 1-2 pixel circuit P12, the 2-1 pixel circuit P21 and the 2-2 pixel circuit P22 receives a data write gate signal GW, a data initialization gate signal GI, an light emitting element initialization signal GB, a corresponding data voltage VDR11, VDB11, VDR21 and VDB21 and the emission signal EM and a corresponding light emitting element EER11, EEB11, EER21 and EEB21 emits light corresponding to the level of the corresponding data voltage VDR11, VDB11, VDR21 and VDB21 to display the image.

The 1-1 pixel circuit P11 may include first to seventh switching elements T111 to T117 and a storage capacitor CST11. The 1-1 light emitting element EER11 may be disposed adjacent to the 1-1 pixel circuit P11. The 1-2 pixel circuit P12 may include first to seventh switching elements T121 to T127 and a storage capacitor CST12. The 1-2 light emitting element EEB11 may be disposed adjacent to the 1-2 pixel circuit P12.

The display panel in FIG. 5 does not include the cross connection between the pixel circuit and the light emitting area which are spaced apart from each other so that the sixth switching element T116 of the 1-1 pixel circuit P11 may be connected to the 1-1 light emitting element EER11 and the sixth switching element T126 of the 1-2 pixel circuit P12 may be connected to the 1-2 light emitting element EEB11.

The 2-1 pixel circuit P21 may include first to seventh switching elements T211 to T217 and a storage capacitor CST21. The 2-1 light emitting element EEB21 may be disposed adjacent to the 2-1 pixel circuit P21. The 2-2 pixel circuit P22 may include first to seventh switching elements T221 to T227 and a storage capacitor CST22. The 2-2 light emitting element EER21 may be disposed adjacent to the 2-2 pixel circuit P22.

The display panel in FIG. 6 includes the cross connection between the pixel circuit and the light emitting area which are spaced apart from each other so that the sixth switching element T216 of the 2-1 pixel circuit P21 may be connected to the 2-2 light emitting element EER21 through the 2-1 connecting line L21 and the sixth switching element T226 of the 2-2 pixel circuit P22 may be connected to the 2-1 light emitting element EEB21 through the 2-2 connecting line L22.

Hereinafter, the circuit diagram of the 1-1 pixel circuit may be explained in detail.

The first switching element T111 may include a control electrode connected to a first node N111, a first electrode connected to a second node N112 and a second electrode connected to a third node N113. For example, the first switching element T111 may be a P-type thin film transistor.

The second switching element T112 may include a control electrode receiving the data write gate signal GW, a first electrode receiving the data voltage VDR11 and a second electrode connected to the second node N112. For example, the second switching element T112 may be a P-type thin film transistor.

The third switching element T113 may include a control electrode receiving the data write gate signal GW, a first electrode connected to the first node N111 and a second electrode connected to the third node N113. For example, the third switching element T113 may be a P-type thin film transistor.

The fourth switching element T114 may include a control electrode receiving the data initialization gate signal GI, a first electrode receiving an initialization voltage VINT and a second electrode connected to the first node N111. For example, the fourth switching element T114 may be a P-type thin film transistor.

The fifth switching element T115 may include a control electrode receiving the emission signal EM, a first electrode receiving a high power voltage ELVDD and a second electrode connected to the second node N112. For example, the fifth switching element T115 may be a P-type thin film transistor.

The sixth switching element T116 may include a control electrode receiving the emission signal EM, a first electrode connected to the third node N113 and a second electrode connected to an anode electrode of the light emitting element EER11. For example, the sixth switching element T116 may be a P-type thin film transistor.

The seventh switching element T117 may include a control electrode receiving the light emitting element initialization gate signal GB, a first electrode receiving the initialization voltage VINT and a second electrode connected to the anode electrode of the light emitting element EER11. For example, the seventh switching element T117 may be a P-type thin film transistor. Although the initialization voltage VINT applied to the first electrode of the seventh switching element T117 is the same as the initialization voltage VINT applied to the first electrode of the fourth switching element T114 in the present embodiment, the present inventive concept may not be limited thereto. Alternatively, the initialization voltage applied to the first electrode of the seventh switching element T117 may be different from the initialization voltage applied to the first electrode of the fourth switching element T114.

The storage capacitor CST11 may include a first electrode receiving the high power voltage ELVDD and a second electrode connected to the first node N111. The light emitting element EER11 may include the anode electrode and a cathode electrode receiving a low power voltage ELVSS.

The circuit diagram of the 1-2 pixel circuit P12 is substantially the same as the circuit diagram of the 1-1 pixel circuit P11 so that an explanation for the circuit diagram of the 1-2 pixel circuit P12 is omitted.

The circuit diagrams of the 2-1 pixel circuit P21 and the 2-2 pixel circuit P22 are substantially the same as the circuit diagrams of the 1-1 pixel circuit P11 and the 1-2 pixel circuit P12 except for the cross connection between the pixel circuit and the light emitting area which are spaced apart from each other so that an explanation for the circuit diagrams for the 2-1 pixel circuit P21 and the 2-2 pixel circuit P22 is omitted.

According to the present embodiment, in the display panel 100 in which the red light emitting area R11, R21, R31 and R41 and the blue light emitting area B11, B21, B31 and B41 are alternately disposed, one data line (e.g. one of DL1 and DL2) outputs a data voltage of only one color (e.g. one of red and blue) without toggling the red data voltage and the blue data voltage so that the power consumption of the display apparatus may be reduced.

The conventional display panel structure to prevent toggling of the red data voltage and the blue data voltage may include additional data lines. In contrast, the display panel structure of the present inventive concept may not include the additional data lines and may have a cross connection (e.g. L21, L22, L41 and L42) between the pixel circuit and the light emitting area which are spaced apart from each other so that the power consumption may not occur for driving the additional data lines and the dead space may be reduced.

Figure 7:
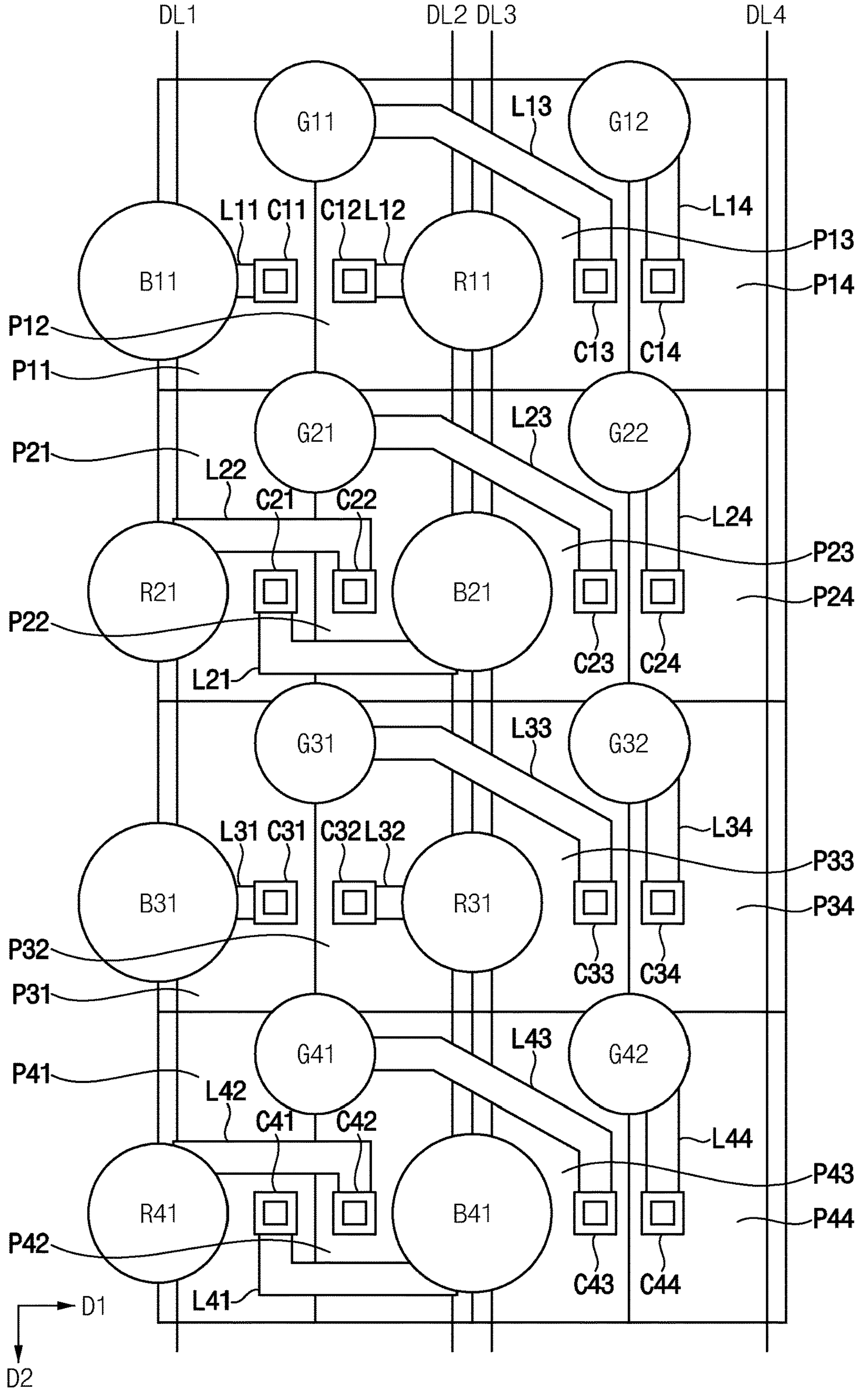
FIG. 7 is a diagram illustrating a pixel circuit and a light emitting area of a display panel according to an embodiment of the present inventive concept.
Figure 8:
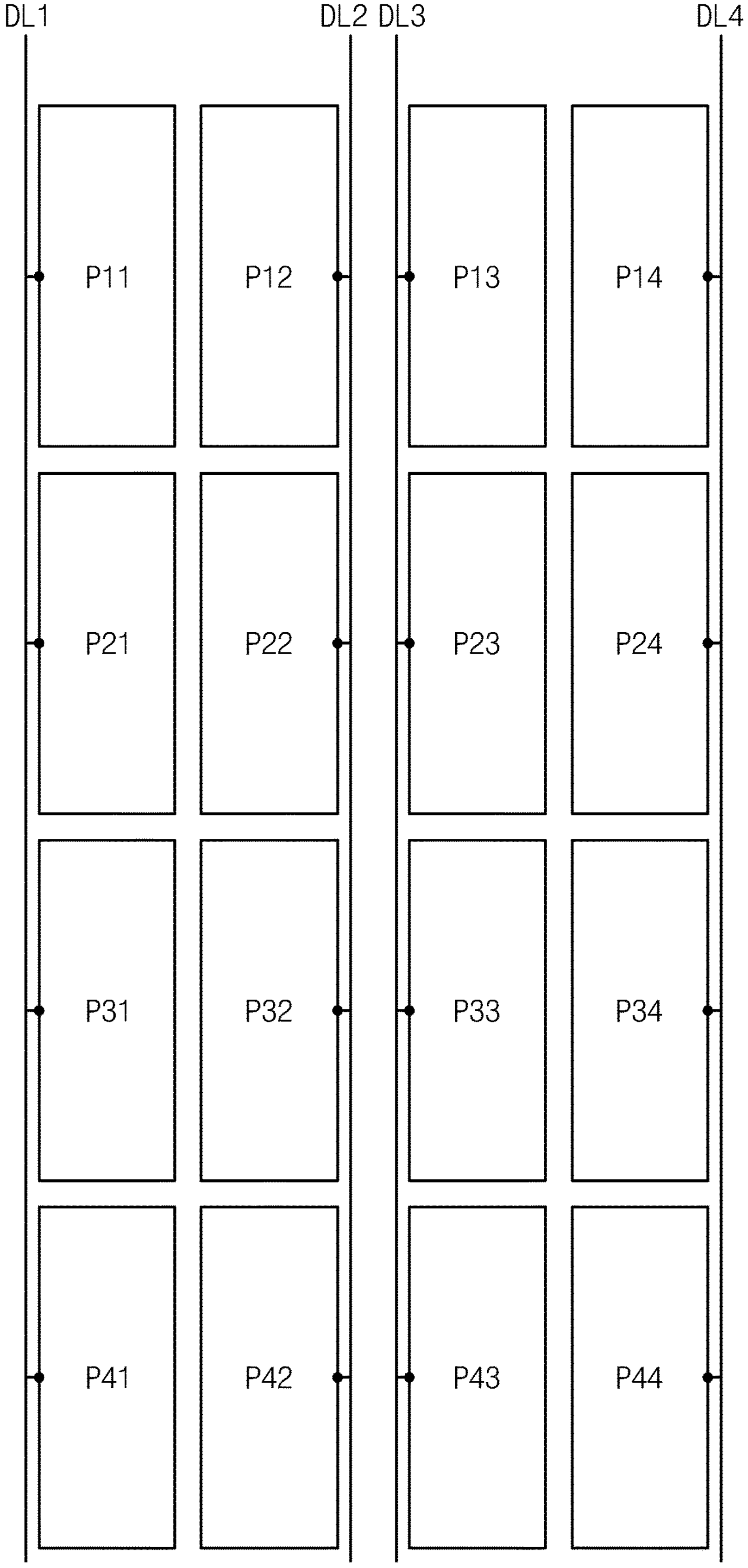
FIG. 8 is a diagram illustrating the pixel circuit of the display panel of FIG. 7.
Figure 9:
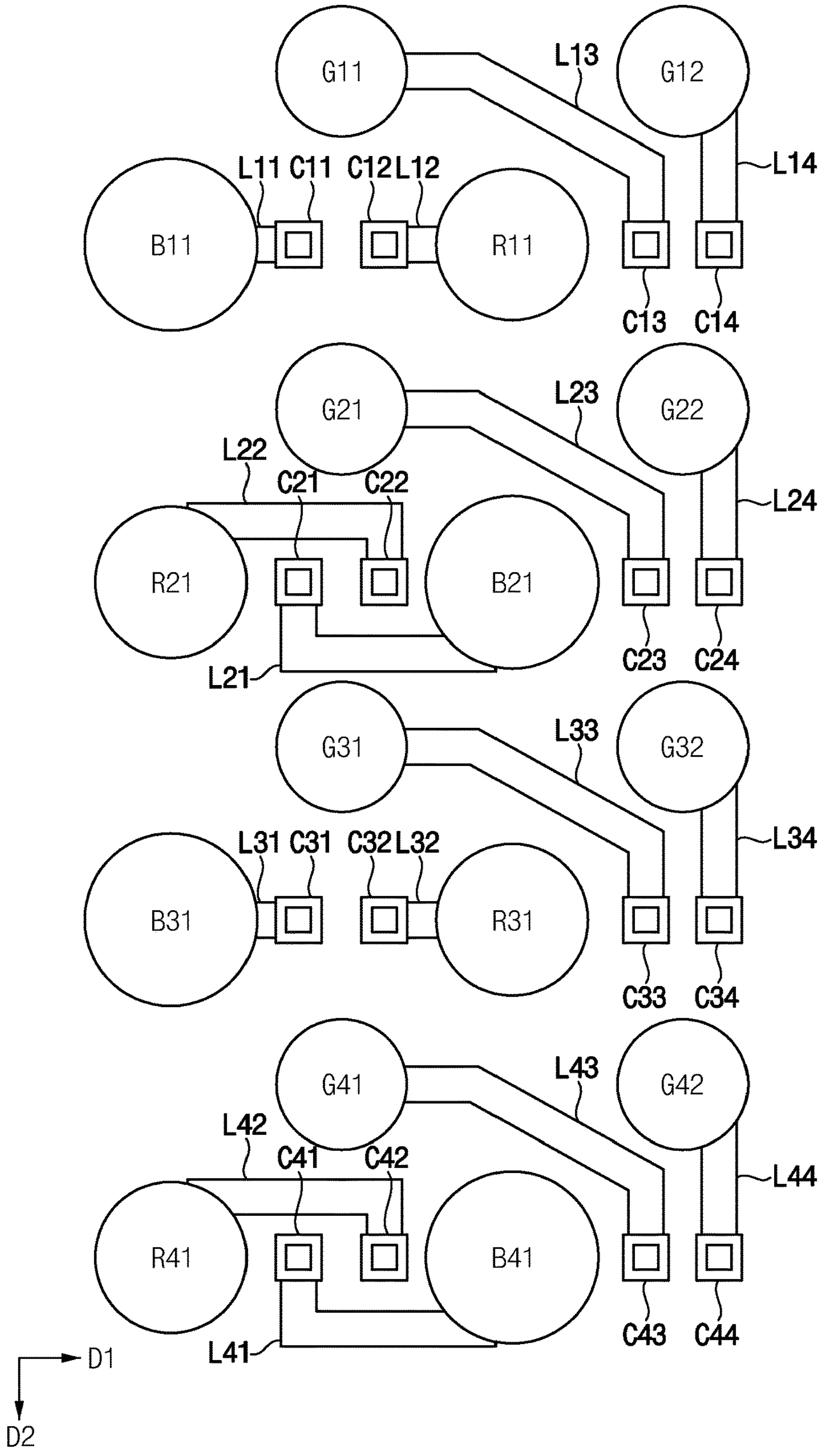
FIG. 9 is a diagram illustrating the light emitting area of the display panel of FIG. 7.

FIG. 7 is a diagram illustrating a pixel circuit and a light emitting area of a display panel 100 according to an embodiment of the present inventive concept. FIG. 8 is a diagram illustrating the pixel circuit of the display panel 100 of FIG. 7. FIG. 9 is a diagram illustrating the light emitting area of the display panel 100 of FIG. 7.

The display apparatus according to the present embodiment is substantially the same as the display apparatus of the previous embodiment explained referring to FIGS. 1 to 6 except that the positions of the red light emitting area and the blue light emitting area are switched in the display panel from the previous embodiment of FIGS. 1 to 6. Thus, the same reference numerals will be used to refer to the same or like parts as those described in the previous embodiment of FIGS. 1 to 6 and any repetitive explanation concerning the above elements will be omitted.

Referring to FIGS. 1, 3 and 7 to 9, the display panel 100 includes a 1-1 pixel circuit P11, a 1-2 pixel circuit P12, a 1-3 pixel circuit P13 and a 1-4 pixel circuit P14 sequentially disposed in the first direction D1 in a first pixel row.

The display panel 100 may further include a 2-1 pixel circuit P21, a 2-2 pixel circuit P22, a 2-3 pixel circuit P23 and a 2-4 pixel circuit P24 sequentially disposed in the first direction D1 in a second pixel row adjacent to the first pixel row in the second direction D2.

The 1-1 pixel circuit P11 may be connected to a first data line DL1, the 1-2 pixel circuit P11 may be connected to a second data line DL2, the 1-3 pixel circuit P13 may be connected to a third data line DL3 and the 1-4 pixel circuit P14 may be connected to a fourth data line DL4.

The 2-1 pixel circuit P21 may be connected to the first data line DL1, the 2-2 pixel circuit P21 may be connected to the second data line DL2, the 2-3 pixel circuit P23 may be connected to the third data line DL3 and the 2-4 pixel circuit P24 may be connected to the fourth data line DL4.

The display panel 100 may include a 1-1 light emitting area B11, a 1-2 light emitting area G11, a 1-3 light emitting area R11 and a 1-4 light emitting area G12 sequentially disposed in the first direction D1.

The display panel 100 may further include a 2-1 light emitting area R21, a 2-2 light emitting area G21, a 2-3 light emitting area B21 and a 2-4 light emitting area G22 sequentially disposed in the first direction D1 and adjacent to the 1-1 to 1-4 light emitting areas B11, G11, R11 and G12 in the second direction D2.

In the present embodiment, the 1-1 pixel circuit P11 may be connected to the 1-1 light emitting area B11, the 1-2 pixel circuit P12 may be connected to the 1-3 light emitting area R11, the 1-3 pixel circuit P13 may be connected to the 1-2 light emitting area G11 and the 1-4 pixel circuit P14 may be connected to the 1-4 light emitting area G12.

In the present embodiment, the 2-1 pixel circuit P21 may be connected to the 2-3 light emitting area B21, the 2-2 pixel circuit P22 may be connected to the 2-1 light emitting area R21, the 2-3 pixel circuit P23 may be connected to the 2-2 light emitting area G21 and the 2-4 pixel circuit P24 may be connected to the 2-4 light emitting area G22.

The 1-1 light emitting area B11 may be a first blue light emitting area, the 1-2 light emitting area G11 may be a 1-1 green light emitting area, the 1-3 light emitting area R11 may be a first red light emitting area and the 1-4 light emitting area G12 may be a 1-2 green light emitting area.

In addition, the 2-1 light emitting area R21 may be a second red light emitting area, the 2-2 light emitting area G21 may be a 2-1 green light emitting area, the 2-3 light emitting area B21 may be a second blue light emitting area and the 2-4 light emitting area G22 may be a 2-2 green light emitting area.

The 1-1 pixel circuit P11 and the 2-1 pixel circuit P21 connected to the first data line DL1 are connected to the 1-1 light emitting area B11 and the 2-3 light emitting area B21 which are the blue light emitting areas so that a blue data voltage may be applied to the first data line DL1.

The 1-2 pixel circuit P12 and the 2-2 pixel circuit P22 connected to the second data line DL2 are connected to the 1-3 light emitting area R11 and the 2-1 light emitting area R21 which are the red light emitting areas so that a red data voltage may be applied to the second data line DL2.

The 1-3 pixel circuit P13 and the 2-3 pixel circuit P23 connected to the third data line DL3 are connected to the 1-2 light emitting area G11 and the 2-2 light emitting area G21 which are the green light emitting areas so that a first green data voltage may be applied to the third data line DL3.

The 1-4 pixel circuit P14 and the 2-4 pixel circuit P24 connected to the fourth data line DL4 are connected to the 1-4 light emitting area G12 and the 2-4 light emitting area G22 which are the green light emitting areas so that a second green data voltage may be applied to the fourth data line DL4.

In the display panel 100 in which the red light emitting area and the blue light emitting area are alternately disposed, one data line (e.g. each of the first data line DL1 and the second data line DL2) outputs the data voltage of only one color without toggling the red data voltage and the blue data voltage so that the power consumption of the display apparatus may be reduced.

In the present embodiment, the 1-2 light emitting area G11 and the 1-4 light emitting area G12 are disposed adjacent to each other in the first direction D1 in a 1-1 row and the 1-1 light emitting area B11 and the 1-3 light emitting area R11 are disposed adjacent to each other in the first direction D1 in a 1-2 row. Herein, the 1-2 row may be disposed under the 1-1 row in the second direction D2. The 1-2 row may be disposed adjacent to the 1-1 row in the second direction D2. The light emitting areas G11 and G12 in the 1-1 row and the light emitting areas B11 and R11 in the 1-2 row may correspond to one pixel row (the first pixel row). The light emitting areas G11 and G12 in the 1-1 row and the light emitting areas B11 and R11 in the 1-2 row may form a first light emitting row corresponding to one pixel row (the first pixel row).

In the present embodiment, the display panel may include a repetitive unit structure including eight pixel circuits in two rows and four columns and eight light emitting areas corresponding to the eight pixel circuits. For example, a unit structure including the pixel circuits P11, P12, P13 and P14 in the first pixel row, the pixel circuits P21, P22, P23 and P24 in the second pixel row and the light emitting areas B11, G11, R11, G12, R21, G21, B21 and G22 corresponding to the pixel circuits P11, P12, P13, P14, P21, P22, P23 and P24 may be disposed repetitively along a row direction and a column direction.

According to the present embodiment, in the display panel 100 in which the red light emitting area R11, R21, R31 and R41 and the blue light emitting area B11, B21, B31 and B41 are alternately disposed, one data line (e.g. one of DL1 and DL2) outputs a data voltage of only one color (e.g. one of red and blue) without toggling the red data voltage and the blue data voltage so that the power consumption of the display apparatus may be reduced.

The conventional display panel structure to prevent toggling of the red data voltage and the blue data voltage may include additional data lines. In contrast, the display panel structure of the present inventive concept may not include the additional data lines and may have a cross connection (e.g. L21, L22, L41 and L42) between the pixel circuit and the light emitting area which are spaced apart from each other so that the power consumption may not occur for driving the additional data lines and the dead space may be reduced.

Figure 10:
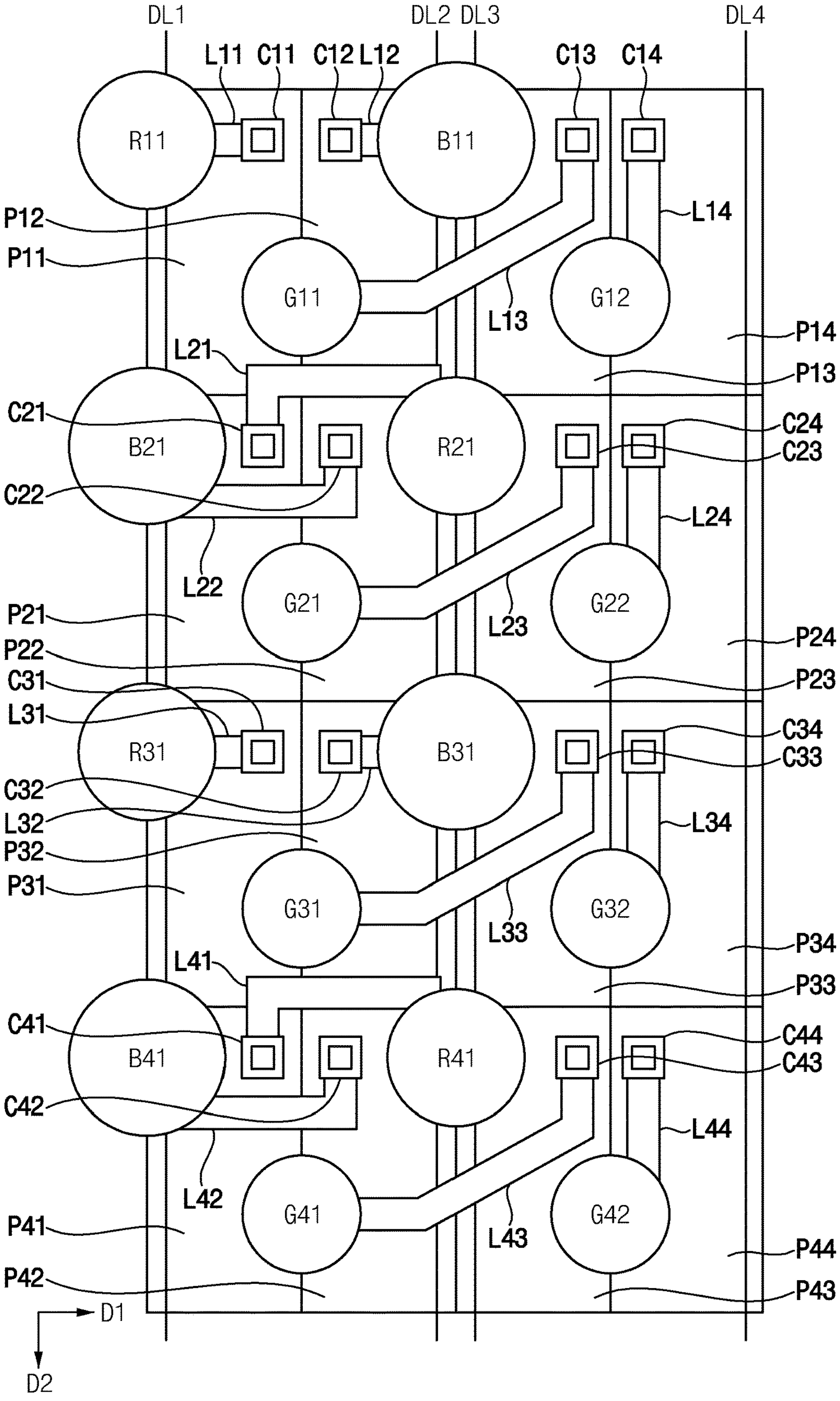
FIG. 10 is a diagram illustrating a pixel circuit and a light emitting area of a display panel according to an embodiment of the present inventive concept.

FIG. 10 is a diagram illustrating a pixel circuit and a light emitting area of a display panel 100 according to an embodiment of the present inventive concept.

The display apparatus according to the present embodiment is substantially the same as the display apparatus of the previous embodiment explained referring to FIGS. 1 to 6 except that the red light emitting area and the blue light emitting area are disposed above the green light emitting area in the same pixel row. Thus, the same reference numerals will be used to refer to the same or like parts as those described in the previous embodiment of FIGS. 1 to 6 and any repetitive explanation concerning the above elements will be omitted.

Referring to FIGS. 1, 3 and 10, the display panel 100 includes a 1-1 pixel circuit P11, a 1-2 pixel circuit P12, a 1-3 pixel circuit P13 and a 1-4 pixel circuit P14 sequentially disposed in the first direction D1 in a first pixel row.

The display panel 100 may further include a 2-1 pixel circuit P21, a 2-2 pixel circuit P22, a 2-3 pixel circuit P23 and a 2-4 pixel circuit P24 sequentially disposed in the first direction D1 in a second pixel row adjacent to the first pixel row in the second direction D2.

The 1-1 pixel circuit P11 may be connected to a first data line DL1, the 1-2 pixel circuit P11 may be connected to a second data line DL2, the 1-3 pixel circuit P13 may be connected to a third data line DL3 and the 1-4 pixel circuit P14 may be connected to a fourth data line DL4.

The 2-1 pixel circuit P21 may be connected to the first data line DL1, the 2-2 pixel circuit P21 may be connected to the second data line DL2, the 2-3 pixel circuit P23 may be connected to the third data line DL3 and the 2-4 pixel circuit P24 may be connected to the fourth data line DL4.

The display panel 100 may include a 1-1 light emitting area R11, a 1-2 light emitting area G11, a 1-3 light emitting area B11 and a 1-4 light emitting area G12 sequentially disposed in the first direction D1.

The display panel 100 may further include a 2-1 light emitting area B21, a 2-2 light emitting area G21, a 2-3 light emitting area R21 and a 2-4 light emitting area G22 sequentially disposed in the first direction D1 and adjacent to the 1-1 to 1-4 light emitting areas R11, G11, B11 and G12 in the second direction D2.

In the present embodiment, the 1-1 pixel circuit P11 may be connected to the 1-1 light emitting area R11, the 1-2 pixel circuit P12 may be connected to the 1-3 light emitting area B11, the 1-3 pixel circuit P13 may be connected to the 1-2 light emitting area G11 and the 1-4 pixel circuit P14 may be connected to the 1-4 light emitting area G12.

In the present embodiment, the 2-1 pixel circuit P21 may be connected to the 2-3 light emitting area R21, the 2-2 pixel circuit P22 may be connected to the 2-1 light emitting area B21, the 2-3 pixel circuit P23 may be connected to the 2-2 light emitting area G21 and the 2-4 pixel circuit P24 may be connected to the 2-4 light emitting area G22.

The 1-1 light emitting area R11 may be a first red light emitting area, the 1-2 light emitting area G11 may be a 1-1 green light emitting area, the 1-3 light emitting area B11 may be a first blue light emitting area and the 1-4 light emitting area G12 may be a 1-2 green light emitting area.

In addition, the 2-1 light emitting area B21 may be a second blue light emitting area, the 2-2 light emitting area G21 may be a 2-1 green light emitting area, the 2-3 light emitting area R21 may be a second red light emitting area and the 2-4 light emitting area G22 may be a 2-2 green light emitting area.

A red data voltage may be applied to the first data line DL1, a blue data voltage may be applied to the second data line DL2, a first green data voltage may be applied to the third data line DL3 and a second green data voltage may be applied to the fourth data line DL4.

In the display panel 100 in which the red light emitting area and the blue light emitting area are alternately disposed, one data line (e.g. each of the first data line DL1 and the second data line DL2) outputs the data voltage of only one color without toggling the red data voltage and the blue data voltage so that the power consumption of the display apparatus may be reduced.

In the present embodiment, the 1-1 light emitting area R11 and the 1-3 light emitting area B11 are disposed adjacent to each other in the first direction D1 in a 1-1 row and the 1-2 light emitting area G11 and the 1-4 light emitting area G12 are disposed adjacent to each other in the first direction D1 in a 1-2 row. Herein, the 1-2 row may be disposed under the 1-1 row in the second direction D2. The 1-2 row may be disposed adjacent to the 1-1 row in the second direction D2. The light emitting areas R11 and B11 in the 1-1 row and the light emitting areas G11 and G12 in the 1-2 row may correspond to one pixel row (the first pixel row). The light emitting areas R11 and B11 in the 1-1 row and the light emitting areas G11 and G12 in the 1-2 row may form a first light emitting row corresponding to one pixel row (the first pixel row).

As shown in FIG. 10, for example, the 1-1 light emitting area R11 may include a first portion overlapping the 1-1 pixel circuit P11 and a second portion not overlapping the 1-1 pixel circuit P11. For example, the 1-1 light emitting area R11 may include a portion which extends from the 1-1 pixel circuit P11 to an outside of a left side of the 1-1 pixel circuit P11 (e.g. to a left pixel column).

For example, the 1-3 light emitting area B11 may include a first portion overlapping the 1-2 pixel circuit P12, a second portion overlapping the 1-3 pixel circuit P13 and a third portion not overlapping the 1-2 pixel circuit P12 and the 1-3 pixel circuit P13.

For example, the 1-2 light emitting area G11 may include a first portion overlapping the 1-1 pixel circuit P11 and a second portion overlapping the 1-2 pixel circuit P12.

For example, the 1-4 light emitting area G12 may include a first portion overlapping the 1-3 pixel circuit P13 and a second portion overlapping the 1-4 pixel circuit P14.

As shown in FIG. 10, for example, the 2-1 light emitting area B21 may include a first portion overlapping the 2-1 pixel circuit P21, a second portion overlapping the 1-1 pixel circuit P11 and a third portion not overlapping the 2-1 pixel circuit P21 and the 1-1 pixel circuit P11.

For example, the 2-3 light emitting area R21 may include a first portion overlapping the 2-2 pixel circuit P22, a second portion overlapping the 2-3 pixel circuit P23, a third portion overlapping the 1-2 pixel circuit P12 and a fourth portion overlapping the 1-3 pixel circuit P13.

For example, the 2-2 light emitting area G21 may include a first portion overlapping the 2-1 pixel circuit P21 and a second portion overlapping the 2-2 pixel circuit P22.

For example, the 2-4 light emitting area G22 may include a first portion overlapping the 2-3 pixel circuit P23 and a second portion overlapping the 2-4 pixel circuit P24.

In the present embodiment, the display panel may include a repetitive unit structure including eight pixel circuits in two rows and four columns and eight light emitting areas corresponding to the eight pixel circuits. For example, a unit structure including the pixel circuits P11, P12, P13 and P14 in the first pixel row, the pixel circuits P21, P22, P23 and P24 in the second pixel row and the light emitting areas R11, G11, B11, G12, B21, G21, R21 and G22 corresponding to the pixel circuits P11, P12, P13, P14, P21, P22, P23 and P24 may be disposed repetitively along a row direction and a column direction.

According to the present embodiment, in the display panel 100 in which the red light emitting area R11, R21, R31 and R41 and the blue light emitting area B11, B21, B31 and B41 are alternately disposed, one data line (e.g. one of DL1 and DL2) outputs a data voltage of only one color (e.g. one of red and blue) without toggling the red data voltage and the blue data voltage so that the power consumption of the display apparatus may be reduced.

The conventional display panel structure to prevent toggling of the red data voltage and the blue data voltage may include additional data lines. In contrast, the display panel structure of the present inventive concept may not include the additional data lines and may have a cross connection (e.g. L21, L22, L41 and L42) between the pixel circuit and the light emitting area which are spaced apart from each other so that the power consumption may not occur for driving the additional data lines and the dead space may be reduced.

Figure 11:
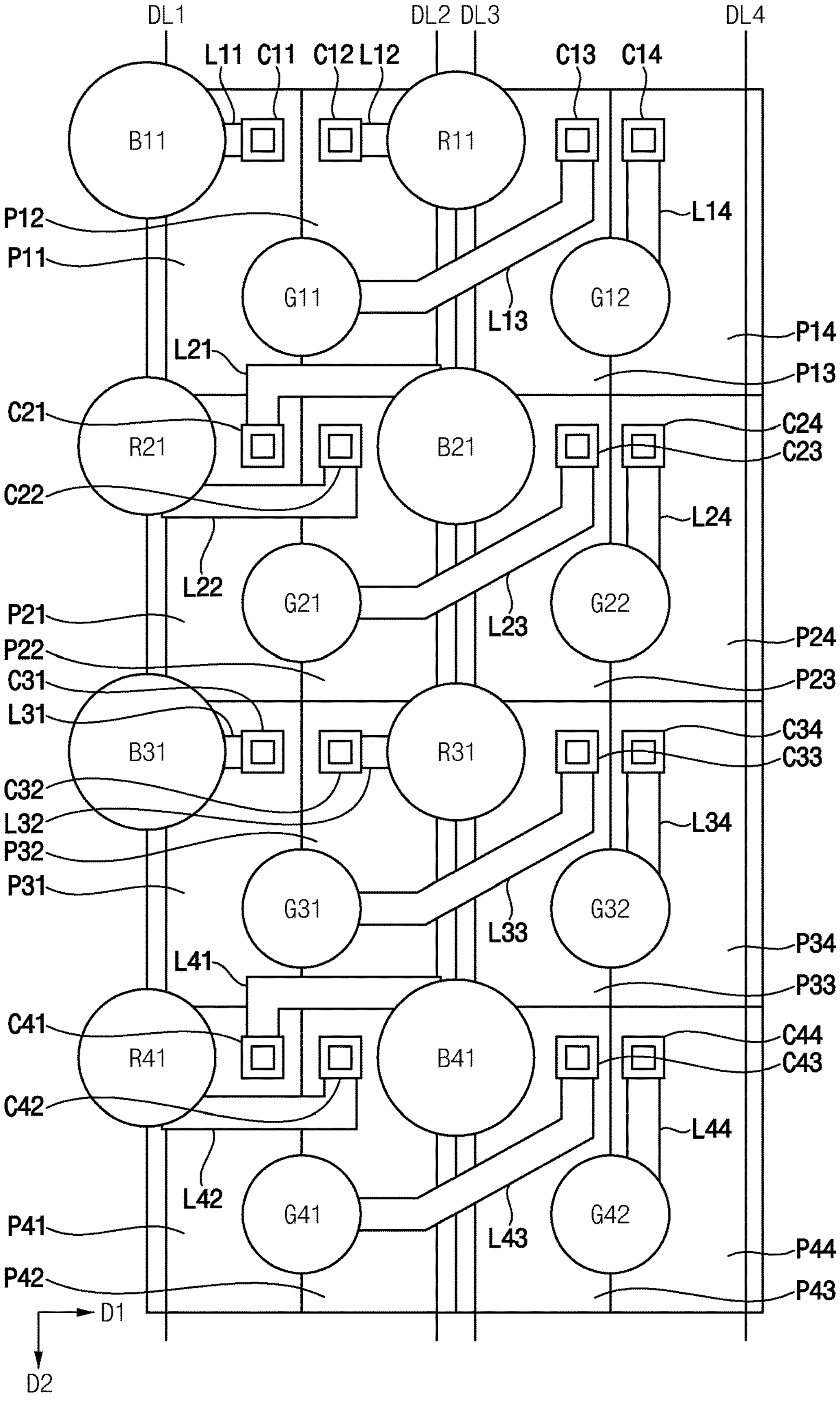
FIG. 11 is a diagram illustrating a pixel circuit and a light emitting area of a display panel according to an embodiment of the present inventive concept.

FIG. 11 is a diagram illustrating a pixel circuit and a light emitting area of a display panel 100 according to an embodiment of the present inventive concept.

The display apparatus according to the present embodiment is substantially the same as the display apparatus of the previous embodiment explained referring to FIGS. 7 to 9 except that the red light emitting area and the blue light emitting area are disposed above the green light emitting area in the same pixel row. Thus, the same reference numerals will be used to refer to the same or like parts as those described in the previous embodiment of FIGS. 7 to 9 and any repetitive explanation concerning the above elements will be omitted.

Referring to FIGS. 1, 3 and 11, the display panel 100 includes a 1-1 pixel circuit P11, a 1-2 pixel circuit P12, a 1-3 pixel circuit P13 and a 1-4 pixel circuit P14 sequentially disposed in the first direction D1 in a first pixel row.

The display panel 100 may further include a 2-1 pixel circuit P21, a 2-2 pixel circuit P22, a 2-3 pixel circuit P23 and a 2-4 pixel circuit P24 sequentially disposed in the first direction D1 in a second pixel row adjacent to the first pixel row in the second direction D2.

The 1-1 pixel circuit P11 may be connected to a first data line DL1, the 1-2 pixel circuit P11 may be connected to a second data line DL2, the 1-3 pixel circuit P13 may be connected to a third data line DL3 and the 1-4 pixel circuit P14 may be connected to a fourth data line DL4.

The 2-1 pixel circuit P21 may be connected to the first data line DL1, the 2-2 pixel circuit P21 may be connected to the second data line DL2, the 2-3 pixel circuit P23 may be connected to the third data line DL3 and the 2-4 pixel circuit P24 may be connected to the fourth data line DL4.

The display panel 100 may include a 1-1 light emitting area B11, a 1-2 light emitting area G11, a 1-3 light emitting area R11 and a 1-4 light emitting area G12 sequentially disposed in the first direction D1.

The display panel 100 may further include a 2-1 light emitting area R21, a 2-2 light emitting area G21, a 2-3 light emitting area B21 and a 2-4 light emitting area G22 sequentially disposed in the first direction D1 and adjacent to the 1-1 to 1-4 light emitting areas B11, G11, R11 and G12 in the second direction D2.

In the present embodiment, the 1-1 pixel circuit P11 may be connected to the 1-1 light emitting area B11, the 1-2 pixel circuit P12 may be connected to the 1-3 light emitting area R11, the 1-3 pixel circuit P13 may be connected to the 1-2 light emitting area G11 and the 1-4 pixel circuit P14 may be connected to the 1-4 light emitting area G12.

In the present embodiment, the 2-1 pixel circuit P21 may be connected to the 2-3 light emitting area B21, the 2-2 pixel circuit P22 may be connected to the 2-1 light emitting area R21, the 2-3 pixel circuit P23 may be connected to the 2-2 light emitting area G21 and the 2-4 pixel circuit P24 may be connected to the 2-4 light emitting area G22.

The 1-1 light emitting area B11 may be a first blue light emitting area, the 1-2 light emitting area G11 may be a 1-1 green light emitting area, the 1-3 light emitting area R11 may be a first red light emitting area and the 1-4 light emitting area G12 may be a 1-2 green light emitting area.

In addition, the 2-1 light emitting area R21 may be a second red light emitting area, the 2-2 light emitting area G21 may be a 2-1 green light emitting area, the 2-3 light emitting area B21 may be a second blue light emitting area and the 2-4 light emitting area G22 may be a 2-2 green light emitting area.

A blue data voltage may be applied to the first data line DL1, a red data voltage may be applied to the second data line DL2, a first green data voltage may be applied to the third data line DL3 and a second green data voltage may be applied to the fourth data line DL4.

In the display panel 100 in which the red light emitting area and the blue light emitting area are alternately disposed, one data line (e.g. each of the first data line DL1 and the second data line DL2) outputs the data voltage of only one color without toggling the red data voltage and the blue data voltage so that the power consumption of the display apparatus may be reduced.

In the present embodiment, the 1-1 light emitting area B11 and the 1-3 light emitting area R11 are disposed adjacent to each other in the first direction D1 in a 1-1 row and the 1-2 light emitting area G11 and the 1-4 light emitting area G12 are disposed adjacent to each other in the first direction D1 in a 1-2 row. Herein, the 1-2 row may be disposed under the 1-1 row in the second direction D2. The 1-2 row may be disposed adjacent to the 1-1 row in the second direction D2. The light emitting areas B11 and R11 in the 1-1 row and the light emitting areas G11 and G12 in the 1-2 row may correspond to one pixel row (the first pixel row). The light emitting areas B11 and R11 in the 1-1 row and the light emitting areas G11 and G12 in the 1-2 row may form a first light emitting row corresponding to one pixel row (the first pixel row).

In the present embodiment, the display panel may include a repetitive unit structure including eight pixel circuits in two rows and four columns and eight light emitting areas corresponding to the eight pixel circuits. For example, a unit structure including the pixel circuits P11, P12, P13 and P14 in the first pixel row, the pixel circuits P21, P22, P23 and P24 in the second pixel row and the light emitting areas B11, G11, R11, G12, R21, G21, B21 and G22 corresponding to the pixel circuits P11, P12, P13, P14, P21, P22, P23 and P24 may be disposed repetitively along a row direction and a column direction.

According to the present embodiment, in the display panel 100 in which the red light emitting area R11, R21, R31 and R41 and the blue light emitting area B11, B21, B31 and B41 are alternately disposed, one data line (e.g. one of DL1 and DL2) outputs a data voltage of only one color (e.g. one of red and blue) without toggling the red data voltage and the blue data voltage so that the power consumption of the display apparatus may be reduced.

The conventional display panel structure to prevent toggling of the red data voltage and the blue data voltage may include additional data lines. In contrast, the display panel structure of the present inventive concept may not include the additional data lines and may have a cross connection (e.g. L21, L22, L41 and L42) between the pixel circuit and the light emitting area which are spaced apart from each other so that the power consumption may not occur for driving the additional data lines and the dead space may be reduced.

Figure 12:
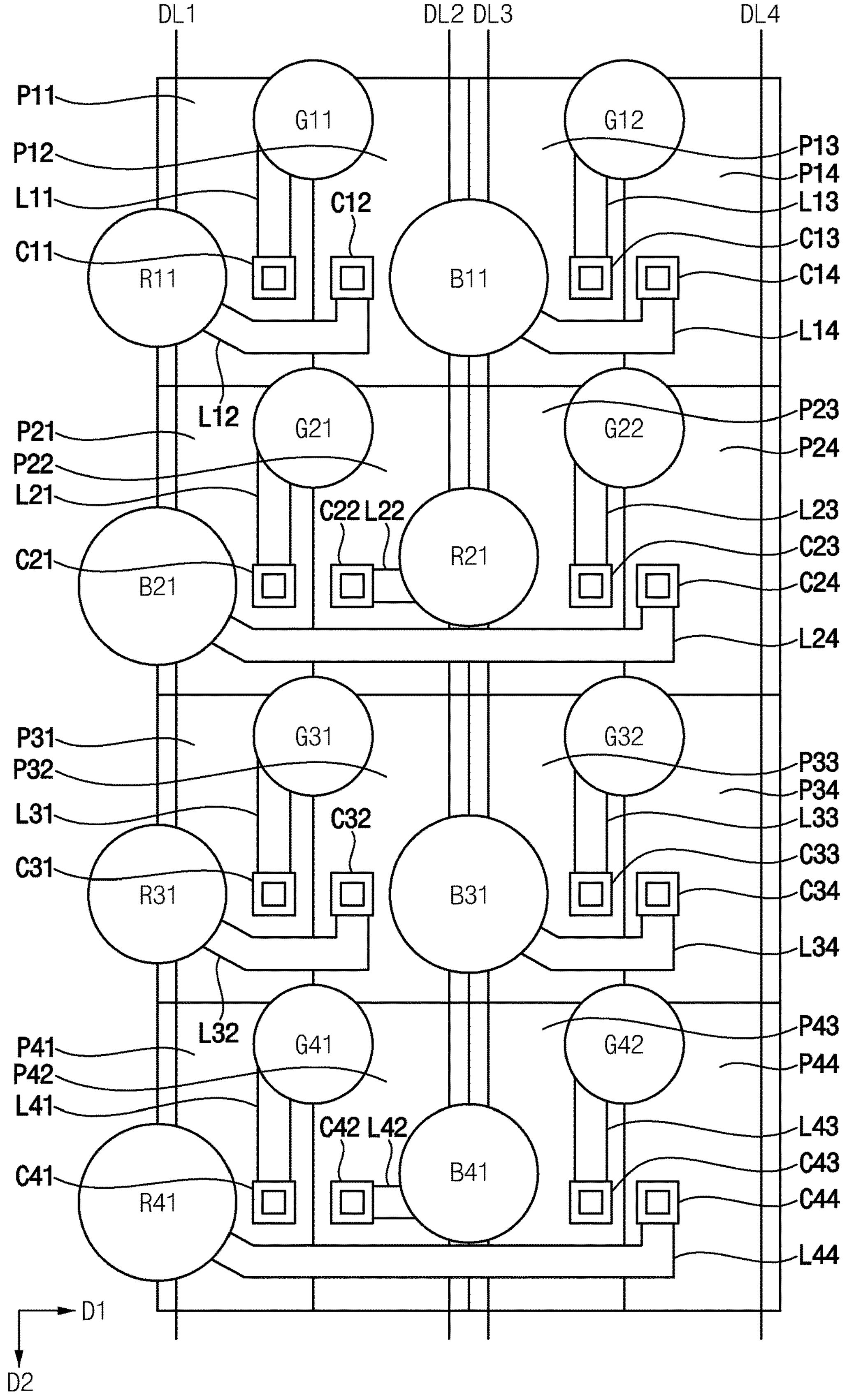
FIG. 12 is a diagram illustrating a pixel circuit and a light emitting area of a display panel according to an embodiment of the present inventive concept.

FIG. 12 is a diagram illustrating a pixel circuit and a light emitting area of a display panel 100 according to an embodiment of the present inventive concept.

The display apparatus according to the present embodiment is substantially the same as the display apparatus of the previous embodiment explained referring to FIGS. 1 to 6 except for the positions and the connections of the pixel circuits and the light emitting areas of the display panel. Thus, the same reference numerals will be used to refer to the same or like parts as those described in the previous embodiment of FIGS. 1 to 6 and any repetitive explanation concerning the above elements will be omitted.

Referring to FIGS. 1, 3 and 12, the display panel 100 includes a 1-1 pixel circuit P11, a 1-2 pixel circuit P12, a 1-3 pixel circuit P13 and a 1-4 pixel circuit P14 sequentially disposed in the first direction D1 in a first pixel row.

The display panel 100 may further include a 2-1 pixel circuit P21, a 2-2 pixel circuit P22, a 2-3 pixel circuit P23 and a 2-4 pixel circuit P24 sequentially disposed in the first direction D1 in a second pixel row adjacent to the first pixel row in the second direction D2.

The 1-1 pixel circuit P11 may be connected to a first data line DL1, the 1-2 pixel circuit P11 may be connected to a second data line DL2, the 1-3 pixel circuit P13 may be connected to a third data line DL3 and the 1-4 pixel circuit P14 may be connected to a fourth data line DL4.

The 2-1 pixel circuit P21 may be connected to the first data line DL1, the 2-2 pixel circuit P21 may be connected to the second data line DL2, the 2-3 pixel circuit P23 may be connected to the third data line DL3 and the 2-4 pixel circuit P24 may be connected to the fourth data line DL4.

In the present embodiment, an area of the pixel circuit may be defined as a rectangle. As shown in FIG. 12, the area of the pixel circuit may be defined to include an area where the data line is disposed between the pixel circuits so that the areas of the adjacent pixel circuits may contact each other. Alternatively, as shown in FIG. 3, the area of the pixel circuit may be defined to exclude the area where the data line is disposed between the pixel circuits.

The display panel 100 may include a 1-1 light emitting area R11, a 1-2 light emitting area G11, a 1-3 light emitting area B11 and a 1-4 light emitting area G12 sequentially disposed in the first direction D1.

The display panel 100 may further include a 2-1 light emitting area B21, a 2-2 light emitting area G21, a 2-3 light emitting area R21 and a 2-4 light emitting area G22 sequentially disposed in the first direction D1 and adjacent to the 1-1 to 1-4 light emitting areas R11, G11, B11 and G12 in the second direction D2.

In the present embodiment, the 1-1 pixel circuit P11 may be connected to the 1-2 light emitting area G11, the 1-2 pixel circuit P12 may be connected to the 1-1 light emitting area R11, the 1-3 pixel circuit P13 may be connected to the 1-4 light emitting area G12 and the 1-4 pixel circuit P14 may be connected to the 1-3 light emitting area B11.

In the present embodiment, the 2-1 pixel circuit P21 may be connected to the 2-2 light emitting area G21, the 2-2 pixel circuit P22 may be connected to the 2-3 light emitting area R21, the 2-3 pixel circuit P23 may be connected to the 2-4 light emitting area G22 and the 2-4 pixel circuit P24 may be connected to the 2-1 light emitting area B21.

The 1-1 light emitting area R11 may be a first red light emitting area, the 1-2 light emitting area G11 may be a 1-1 green light emitting area, the 1-3 light emitting area B11 may be a first blue light emitting area and the 1-4 light emitting area G12 may be a 1-2 green light emitting area.

In addition, the 2-1 light emitting area B21 may be a second blue light emitting area, the 2-2 light emitting area G21 may be a 2-1 green light emitting area, the 2-3 light emitting area R21 may be a second red light emitting area and the 2-4 light emitting area G22 may be a 2-2 green light emitting area.

The 1-1 pixel circuit P11 and the 2-1 pixel circuit P21 connected to the first data line DL1 are connected to the 1-2 light emitting area G11 and the 2-2 light emitting area G21 which are the green light emitting areas so that a first green data voltage may be applied to the first data line DL1.

The 1-2 pixel circuit P12 and the 2-2 pixel circuit P22 connected to the second data line DL2 are connected to the 1-1 light emitting area R11 and the 2-3 light emitting area R21 which are the red light emitting areas so that a red data voltage may be applied to the second data line DL2.

The 1-3 pixel circuit P13 and the 2-3 pixel circuit P23 connected to the third data line DL3 are connected to the 1-4 light emitting area G12 and the 2-4 light emitting area G22 which are the green light emitting areas so that a second green data voltage may be applied to the third data line DL3.

The 1-4 pixel circuit P14 and the 2-4 pixel circuit P24 connected to the fourth data line DL4 are connected to the 1-3 light emitting area B11 and the 2-1 light emitting area B21 which are the blue light emitting areas so that a blue data voltage may be applied to the fourth data line DL4.

In the display panel 100 in which the red light emitting area and the blue light emitting area are alternately disposed, one data line (e.g. each of the second data line DL2 and the fourth data line DL4) outputs the data voltage of only one color without toggling the red data voltage and the blue data voltage so that the power consumption of the display apparatus may be reduced.

In the present embodiment, the 1-2 light emitting area G11 and the 1-4 light emitting area G12 are disposed adjacent to each other in the first direction D1 in a 1-1 row and the 1-1 light emitting area R11 and the 1-3 light emitting area B11 are disposed adjacent to each other in the first direction D1 in a 1-2 row. Herein, the 1-2 row may be disposed under the 1-1 row in the second direction D2. The 1-2 row may be disposed adjacent to the 1-1 row in the second direction D2. The light emitting areas G11 and G12 in the 1-1 row and the light emitting areas R11 and B11 in the 1-2 row may correspond to one pixel row (the first pixel row). The light emitting areas G11 and G12 in the 1-1 row and the light emitting areas R11 and B11 in the 1-2 row may form a first light emitting row corresponding to one pixel row (the first pixel row).

In the present embodiment, the display panel may include a repetitive unit structure including eight pixel circuits in two rows and four columns and eight light emitting areas corresponding to the eight pixel circuits. For example, a unit structure including the pixel circuits P11, P12, P13 and P14 in the first pixel row, the pixel circuits P21, P22, P23 and P24 in the second pixel row and the light emitting areas R11, G11, B11, G12, B21, G21, R21 and G22 corresponding to the pixel circuits P11, P12, P13, P14, P21, P22, P23 and P24 may be disposed repetitively along a row direction and a column direction.

According to the present embodiment, in the display panel 100 in which the red light emitting area R11, R21, R31 and R41 and the blue light emitting area B11, B21, B31 and B41 are alternately disposed, one data line (e.g. one of DL2 and DL4) outputs a data voltage of only one color (e.g. one of red and blue) without toggling the red data voltage and the blue data voltage so that the power consumption of the display apparatus may be reduced.

In the present embodiment, the 1-2 pixel circuit P12 may be connected to the 1-1 light emitting area R11 and the 1-4 pixel circuit P14 may be connected to the 1-3 light emitting area B11. The 1-2 pixel circuit P12 may be connected to the 1-1 light emitting area R11 through a 1-2 contact portion C12 and a 1-2 connecting line L12. The 1-4 pixel circuit P14 may be connected to the 1-3 light emitting area B11 through a 1-4 contact portion C14 and a 1-4 connecting line L14.

In the present embodiment, the 2-2 pixel circuit P22 may be connected to the 2-3 light emitting area R21 and the 2-4 pixel circuit P24 may be connected to the 2-1 light emitting area B21. The 2-2 pixel circuit P22 may be connected to the 2-3 light emitting area R21 through a 2-2 contact portion C22 and a 2-2 connecting line L22. The 2-4 pixel circuit P24 may be connected to the 2-1 light emitting area B21 through a 2-4 contact portion C24 and a 2-4 connecting line L24.

The conventional display panel structure to prevent toggling of the red data voltage and the blue data voltage may include additional data lines. In contrast, the display panel structure of the present inventive concept may not include the additional data lines and may have a cross connection (e.g. L22, L24, L42 and L44) between the pixel circuit and the light emitting area which are spaced apart from each other so that the power consumption may not occur for driving the additional data lines and the dead space may be reduced.

Figure 13:
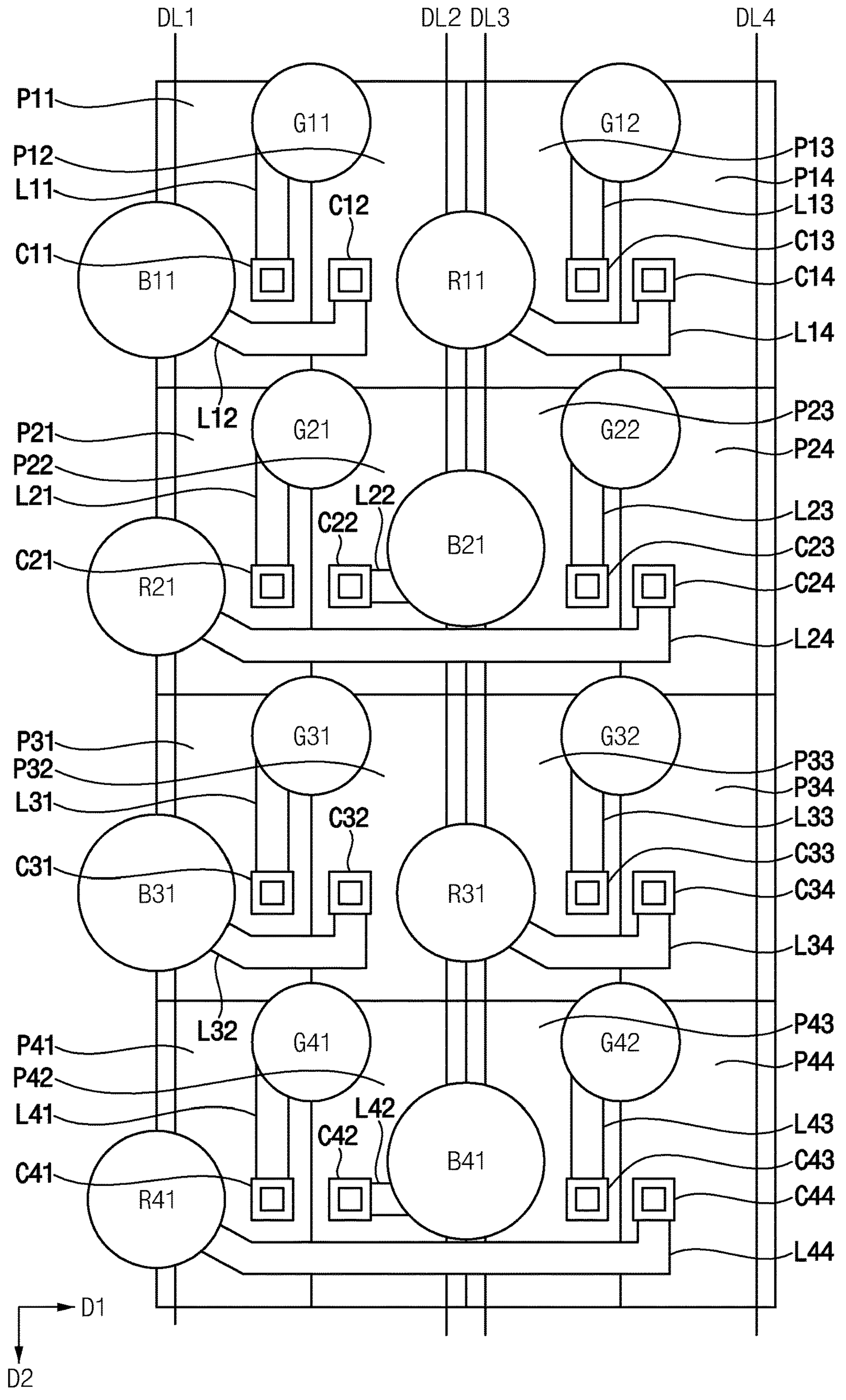
FIG. 13 is a diagram illustrating a pixel circuit and a light emitting area of a display panel according to an embodiment of the present inventive concept.

FIG. 13 is a diagram illustrating a pixel circuit and a light emitting area of a display panel 100 according to an embodiment of the present inventive concept.

The display apparatus according to the present embodiment is substantially the same as the display apparatus of the previous embodiment explained referring to FIG. 12 except that the positions of the red light emitting area and the blue light emitting area are switched in the display panel from the previous embodiment of FIG. 12. Thus, the same reference numerals will be used to refer to the same or like parts as those described in the previous embodiment of FIG. 12 and any repetitive explanation concerning the above elements will be omitted.

Referring to FIGS. 1, 3 and 13, the display panel 100 includes a 1-1 pixel circuit P11, a 1-2 pixel circuit P12, a 1-3 pixel circuit P13 and a 1-4 pixel circuit P14 sequentially disposed in the first direction D1 in a first pixel row.

The display panel 100 may further include a 2-1 pixel circuit P21, a 2-2 pixel circuit P22, a 2-3 pixel circuit P23 and a 2-4 pixel circuit P24 sequentially disposed in the first direction D1 in a second pixel row adjacent to the first pixel row in the second direction D2.

The 1-1 pixel circuit P11 may be connected to a first data line DL1, the 1-2 pixel circuit P11 may be connected to a second data line DL2, the 1-3 pixel circuit P13 may be connected to a third data line DL3 and the 1-4 pixel circuit P14 may be connected to a fourth data line DL4.

The 2-1 pixel circuit P21 may be connected to the first data line DL1, the 2-2 pixel circuit P21 may be connected to the second data line DL2, the 2-3 pixel circuit P23 may be connected to the third data line DL3 and the 2-4 pixel circuit P24 may be connected to the fourth data line DL4.

The display panel 100 may include a 1-1 light emitting area B11, a 1-2 light emitting area G11, a 1-3 light emitting area R11 and a 1-4 light emitting area G12 sequentially disposed in the first direction D1.

The display panel 100 may further include a 2-1 light emitting area R21, a 2-2 light emitting area G21, a 2-3 light emitting area B21 and a 2-4 light emitting area G22 sequentially disposed in the first direction D1 and adjacent to the 1-1 to 1-4 light emitting areas B11, G11, R11 and G12 in the second direction D2.

In the present embodiment, the 1-1 pixel circuit P11 may be connected to the 1-2 light emitting area G11, the 1-2 pixel circuit P12 may be connected to the 1-1 light emitting area B11, the 1-3 pixel circuit P13 may be connected to the 1-4 light emitting area G12 and the 1-4 pixel circuit P14 may be connected to the 1-3 light emitting area R11.

In the present embodiment, the 2-1 pixel circuit P21 may be connected to the 2-2 light emitting area G21, the 2-2 pixel circuit P22 may be connected to the 2-3 light emitting area B21, the 2-3 pixel circuit P23 may be connected to the 2-4 light emitting area G22 and the 2-4 pixel circuit P24 may be connected to the 2-1 light emitting area R21.

The 1-1 light emitting area B11 may be a first blue light emitting area, the 1-2 light emitting area G11 may be a 1-1 green light emitting area, the 1-3 light emitting area R11 may be a first red light emitting area and the 1-4 light emitting area G12 may be a 1-2 green light emitting area.

In addition, the 2-1 light emitting area R21 may be a second red light emitting area, the 2-2 light emitting area G21 may be a 2-1 green light emitting area, the 2-3 light emitting area B21 may be a second blue light emitting area and the 2-4 light emitting area G22 may be a 2-2 green light emitting area.

The 1-1 pixel circuit P11 and the 2-1 pixel circuit P21 connected to the first data line DL1 are connected to the 1-2 light emitting area G11 and the 2-2 light emitting area G21 which are the green light emitting areas so that a first green data voltage may be applied to the first data line DL1.

The 1-2 pixel circuit P12 and the 2-2 pixel circuit P22 connected to the second data line DL2 are connected to the 1-1 light emitting area B11 and the 2-3 light emitting area B21 which are the blue light emitting areas so that a blue data voltage may be applied to the second data line DL2.

The 1-3 pixel circuit P13 and the 2-3 pixel circuit P23 connected to the third data line DL3 are connected to the 1-4 light emitting area G12 and the 2-4 light emitting area G22 which are the green light emitting areas so that a second green data voltage may be applied to the third data line DL3.

The 1-4 pixel circuit P14 and the 2-4 pixel circuit P24 connected to the fourth data line DL4 are connected to the 1-3 light emitting area R11 and the 2-1 light emitting area R21 which are the red light emitting areas so that a red data voltage may be applied to the fourth data line DL4.

In the display panel 100 in which the red light emitting area and the blue light emitting area are alternately disposed, one data line (e.g. each of the second data line DL2 and the fourth data line DL4) outputs the data voltage of only one color without toggling the red data voltage and the blue data voltage so that the power consumption of the display apparatus may be reduced.

In the present embodiment, the 1-2 light emitting area G11 and the 1-4 light emitting area G12 are disposed adjacent to each other in the first direction D1 in a 1-1 row and the 1-1 light emitting area B11 and the 1-3 light emitting area R11 are disposed adjacent to each other in the first direction D1 in a 1-2 row. Herein, the 1-2 row may be disposed under the 1-1 row in the second direction D2. The 1-2 row may be disposed adjacent to the 1-1 row in the second direction D2. The light emitting areas G11 and G12 in the 1-1 row and the light emitting areas B11 and R11 in the 1-2 row may correspond to one pixel row (the first pixel row). The light emitting areas G11 and G12 in the 1-1 row and the light emitting areas B11 and R11 in the 1-2 row may form a first light emitting row corresponding to one pixel row (the first pixel row).

In the present embodiment, the display panel may include a repetitive unit structure including eight pixel circuits in two rows and four columns and eight light emitting areas corresponding to the eight pixel circuits. For example, a unit structure including the pixel circuits P11, P12, P13 and P14 in the first pixel row, the pixel circuits P21, P22, P23 and P24 in the second pixel row and the light emitting areas B11, G11, R11, G12, R21, G21, B21 and G22 corresponding to the pixel circuits P11, P12, P13, P14, P21, P22, P23 and P24 may be disposed repetitively along a row direction and a column direction.

According to the present embodiment, in the display panel 100 in which the red light emitting area R11, R21, R31 and R41 and the blue light emitting area B11, B21, B31 and B41 are alternately disposed, one data line (e.g. one of DL2 and DL4) outputs a data voltage of only one color (e.g. one of red and blue) without toggling the red data voltage and the blue data voltage so that the power consumption of the display apparatus may be reduced.

In the present embodiment, the 1-2 pixel circuit P12 may be connected to the 1-1 light emitting area B11 and the 1-4 pixel circuit P14 may be connected to the 1-3 light emitting area R11. The 1-2 pixel circuit P12 may be connected to the 1-1 light emitting area R11 through a 1-2 contact portion C12 and a 1-2 connecting line L12. The 1-4 pixel circuit P14 may be connected to the 1-3 light emitting area B11 through a 1-4 contact portion C14 and a 1-4 connecting line L14.

In the present embodiment, the 2-2 pixel circuit P22 may be connected to the 2-3 light emitting area B21 and the 2-4 pixel circuit P24 may be connected to the 2-1 light emitting area R21. The 2-2 pixel circuit P22 may be connected to the 2-3 light emitting area B21 through a 2-2 contact portion C22 and a 2-2 connecting line L22. The 2-4 pixel circuit P24 may be connected to the 2-1 light emitting area R21 through a 2-4 contact portion C24 and a 2-4 connecting line L24.

The conventional display panel structure to prevent toggling of the red data voltage and the blue data voltage may include additional data lines. In contrast, the display panel structure of the present inventive concept may not include the additional data lines and may have a cross connection (e.g. L22, L24, L42 and L44) between the pixel circuit and the light emitting area which are spaced apart from each other so that the power consumption may not occur for driving the additional data lines and the dead space may be reduced.

Figure 14:
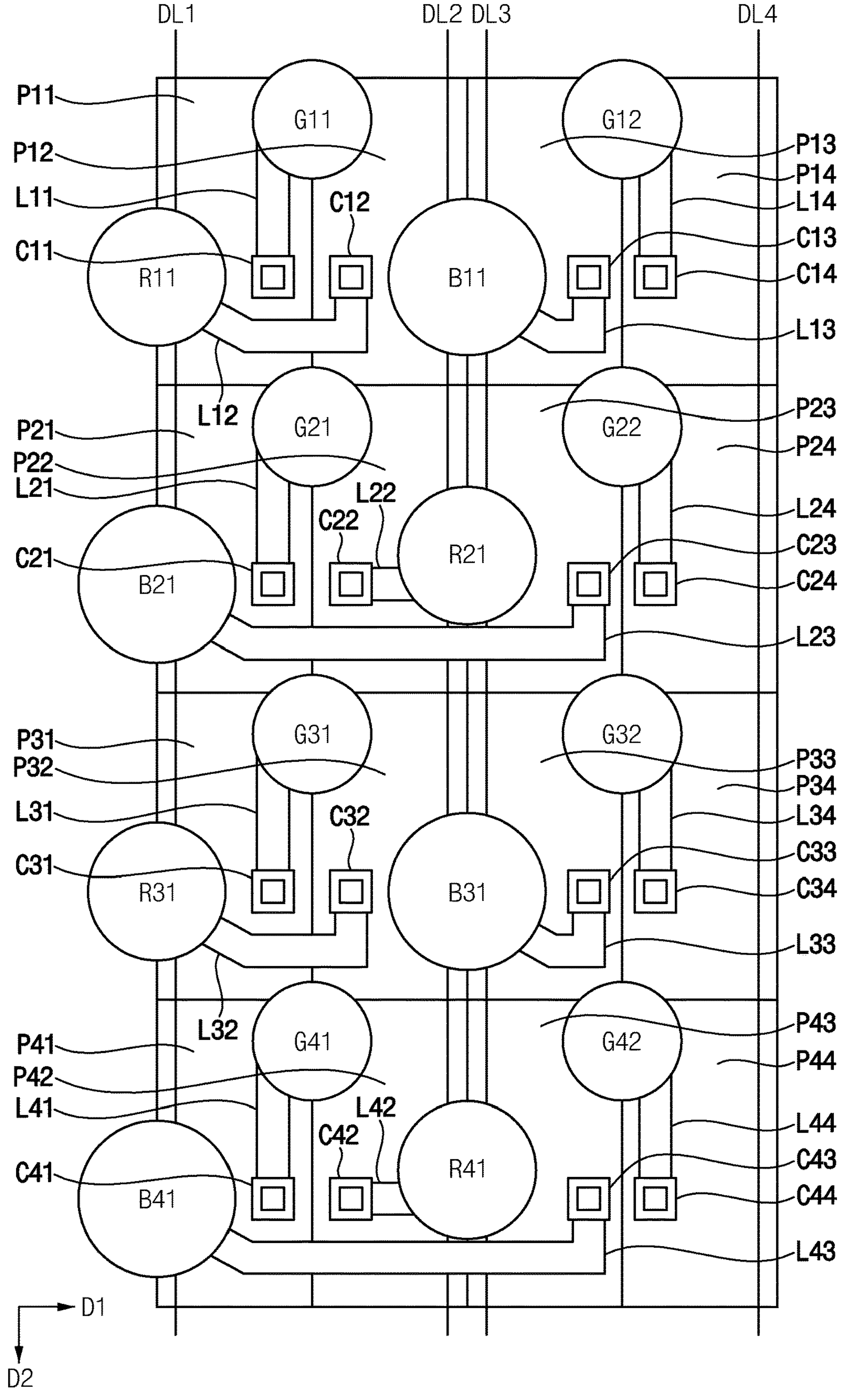
FIG. 14 is a diagram illustrating a pixel circuit and a light emitting area of a display panel according to an embodiment of the present inventive concept.

FIG. 14 is a diagram illustrating a pixel circuit and a light emitting area of a display panel 100 according to an embodiment of the present inventive concept.

The display apparatus according to the present embodiment is substantially the same as the display apparatus of the previous embodiment explained referring to FIGS. 1 to 6 except for the positions and the connections of the pixel circuits and the light emitting areas of the display panel. Thus, the same reference numerals will be used to refer to the same or like parts as those described in the previous embodiment of FIGS. 1 to 6 and any repetitive explanation concerning the above elements will be omitted.

Referring to FIGS. 1, 3 and 14, the display panel 100 includes a 1-1 pixel circuit P11, a 1-2 pixel circuit P12, a 1-3 pixel circuit P13 and a 1-4 pixel circuit P14 sequentially disposed in the first direction D1 in a first pixel row.

The display panel 100 may further include a 2-1 pixel circuit P21, a 2-2 pixel circuit P22, a 2-3 pixel circuit P23 and a 2-4 pixel circuit P24 sequentially disposed in the first direction D1 in a second pixel row adjacent to the first pixel row in the second direction D2.

The 1-1 pixel circuit P11 may be connected to a first data line DL1, the 1-2 pixel circuit P11 may be connected to a second data line DL2, the 1-3 pixel circuit P13 may be connected to a third data line DL3 and the 1-4 pixel circuit P14 may be connected to a fourth data line DL4.

The 2-1 pixel circuit P21 may be connected to the first data line DL1, the 2-2 pixel circuit P21 may be connected to the second data line DL2, the 2-3 pixel circuit P23 may be connected to the third data line DL3 and the 2-4 pixel circuit P24 may be connected to the fourth data line DL4.

In the present embodiment, an area of the pixel circuit may be defined as a rectangle. As shown in FIG. 14, the area of the pixel circuit may be defined to include an area where the data line is disposed between the pixel circuits so that the areas of the adjacent pixel circuits may contact each other. Alternatively, as shown in FIG. 3, the area of the pixel circuit may be defined to exclude the area where the data line is disposed between the pixel circuits.

The display panel 100 may include a 1-1 light emitting area R11, a 1-2 light emitting area G11, a 1-3 light emitting area B11 and a 1-4 light emitting area G12 sequentially disposed in the first direction D1.

The display panel 100 may further include a 2-1 light emitting area B21, a 2-2 light emitting area G21, a 2-3 light emitting area R21 and a 2-4 light emitting area G22 sequentially disposed in the first direction D1 and adjacent to the 1-1 to 1-4 light emitting areas R11, G11, B11 and G12 in the second direction D2.

In the present embodiment, the 1-1 pixel circuit P11 may be connected to the 1-2 light emitting area G11, the 1-2 pixel circuit P12 may be connected to the 1-1 light emitting area R11, the 1-3 pixel circuit P13 may be connected to the 1-3 light emitting area B11 and the 1-4 pixel circuit P14 may be connected to the 1-4 light emitting area G12.

In the present embodiment, the 2-1 pixel circuit P21 may be connected to the 2-2 light emitting area G21, the 2-2 pixel circuit P22 may be connected to the 2-3 light emitting area R21, the 2-3 pixel circuit P23 may be connected to the 2-1 light emitting area B21 and the 2-4 pixel circuit P24 may be connected to the 2-4 light emitting area G22.

The 1-1 light emitting area R11 may be a first red light emitting area, the 1-2 light emitting area G11 may be a 1-1 green light emitting area, the 1-3 light emitting area B11 may be a first blue light emitting area and the 1-4 light emitting area G12 may be a 1-2 green light emitting area.

In addition, the 2-1 light emitting area B21 may be a second blue light emitting area, the 2-2 light emitting area G21 may be a 2-1 green light emitting area, the 2-3 light emitting area R21 may be a second red light emitting area and the 2-4 light emitting area G22 may be a 2-2 green light emitting area.

The 1-1 pixel circuit P11 and the 2-1 pixel circuit P21 connected to the first data line DL1 are connected to the 1-2 light emitting area G11 and the 2-2 light emitting area G21 which are the green light emitting areas so that a first green data voltage may be applied to the first data line DL1.

The 1-2 pixel circuit P12 and the 2-2 pixel circuit P22 connected to the second data line DL2 are connected to the 1-1 light emitting area R11 and the 2-3 light emitting area R21 which are the red light emitting areas so that a red data voltage may be applied to the second data line DL2.

The 1-3 pixel circuit P13 and the 2-3 pixel circuit P23 connected to the third data line DL3 are connected to the 1-3 light emitting area B11 and the 2-1 light emitting area B21 which are the blue light emitting areas so that a blue data voltage may be applied to the third data line DL3.

The 1-4 pixel circuit P14 and the 2-4 pixel circuit P24 connected to the fourth data line DL4 are connected to the 1-4 light emitting area G12 and the 2-4 light emitting area G22 which are the green light emitting areas so that a second green data voltage may be applied to the fourth data line DL4.

In the display panel 100 in which the red light emitting area and the blue light emitting area are alternately disposed, one data line (e.g. each of the second data line DL2 and the third data line DL3) outputs the data voltage of only one color without toggling the red data voltage and the blue data voltage so that the power consumption of the display apparatus may be reduced.

In the present embodiment, the 1-2 light emitting area G11 and the 1-4 light emitting area G12 are disposed adjacent to each other in the first direction D1 in a 1-1 row and the 1-1 light emitting area R11 and the 1-3 light emitting area B11 are disposed adjacent to each other in the first direction D1 in a 1-2 row. Herein, the 1-2 row may be disposed under the 1-1 row in the second direction D2. The 1-2 row may be disposed adjacent to the 1-1 row in the second direction D2. The light emitting areas G11 and G12 in the 1-1 row and the light emitting areas R11 and B11 in the 1-2 row may correspond to one pixel row (the first pixel row). The light emitting areas G11 and G12 in the 1-1 row and the light emitting areas R11 and B11 in the 1-2 row may form a first light emitting row corresponding to one pixel row (the first pixel row).

In the present embodiment, the display panel may include a repetitive unit structure including eight pixel circuits in two rows and four columns and eight light emitting areas corresponding to the eight pixel circuits. For example, a unit structure including the pixel circuits P11, P12, P13 and P14 in the first pixel row, the pixel circuits P21, P22, P23 and P24 in the second pixel row and the light emitting areas R11, G11, B11, G12, B21, G21, R21 and G22 corresponding to the pixel circuits P11, P12, P13, P14, P21, P22, P23 and P24 may be disposed repetitively along a row direction and a column direction.

According to the present embodiment, in the display panel 100 in which the red light emitting area R11, R21, R31 and R41 and the blue light emitting area B11, B21, B31 and B41 are alternately disposed, one data line (e.g. one of DL2 and DL3) outputs a data voltage of only one color (e.g. one of red and blue) without toggling the red data voltage and the blue data voltage so that the power consumption of the display apparatus may be reduced.

In the present embodiment, the 1-2 pixel circuit P12 may be connected to the 1-1 light emitting area R11 and the 1-3 pixel circuit P13 may be connected to the 1-3 light emitting area B11. The 1-2 pixel circuit P12 may be connected to the 1-1 light emitting area R11 through a 1-2 contact portion C12 and a 1-2 connecting line L12. The 1-3 pixel circuit P13 may be connected to the 1-3 light emitting area B11 through a 1-3 contact portion C13 and a 1-3 connecting line L13.

In the present embodiment, the 2-2 pixel circuit P22 may be connected to the 2-3 light emitting area R21 and the 2-3 pixel circuit P23 may be connected to the 2-1 light emitting area B21. The 2-2 pixel circuit P22 may be connected to the 2-3 light emitting area R21 through a 2-2 contact portion C22 and a 2-2 connecting line L22. The 2-3 pixel circuit P23 may be connected to the 2-1 light emitting area B21 through a 2-3 contact portion C23 and a 2-3 connecting line L23.

The conventional display panel structure to prevent toggling of the red data voltage and the blue data voltage may include additional data lines. In contrast, the display panel structure of the present inventive concept may not include the additional data lines and may have a cross connection (e.g. L22, L23, L42 and L43) between the pixel circuit and the light emitting area which are spaced apart from each other so that the power consumption may not occur for driving the additional data lines and the dead space may be reduced.

Figure 15:
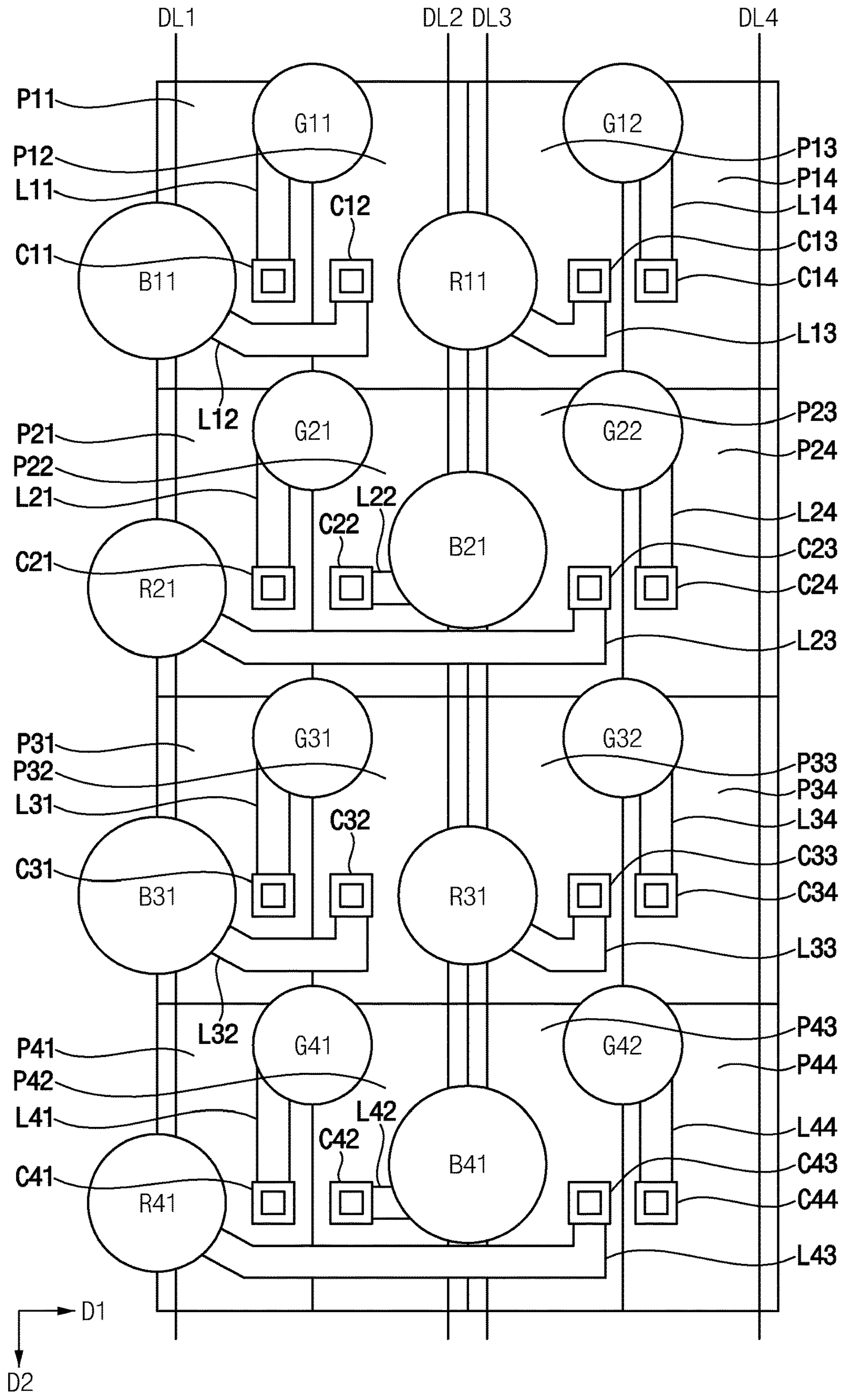
FIG. 15 is a diagram illustrating a pixel circuit and a light emitting area of a display panel according to an embodiment of the present inventive concept.

FIG. 15 is a diagram illustrating a pixel circuit and a light emitting area of a display panel according to an embodiment of the present inventive concept.

The display apparatus according to the present embodiment is substantially the same as the display apparatus of the previous embodiment explained referring to FIG. 14 except that the positions of the red light emitting area and the blue light emitting area are switched in the display panel from the previous embodiment of FIG. 14. Thus, the same reference numerals will be used to refer to the same or like parts as those described in the previous embodiment of FIG. 14 and any repetitive explanation concerning the above elements will be omitted.

Referring to FIGS. 1, 3 and 15, the display panel 100 includes a 1-1 pixel circuit P11, a 1-2 pixel circuit P12, a 1-3 pixel circuit P13 and a 1-4 pixel circuit P14 sequentially disposed in the first direction D1 in a first pixel row.

The display panel 100 may further include a 2-1 pixel circuit P21, a 2-2 pixel circuit P22, a 2-3 pixel circuit P23 and a 2-4 pixel circuit P24 sequentially disposed in the first direction D1 in a second pixel row adjacent to the first pixel row in the second direction D2.

The 1-1 pixel circuit P11 may be connected to a first data line DL1, the 1-2 pixel circuit P11 may be connected to a second data line DL2, the 1-3 pixel circuit P13 may be connected to a third data line DL3 and the 1-4 pixel circuit P14 may be connected to a fourth data line DL4.

The 2-1 pixel circuit P21 may be connected to the first data line DL1, the 2-2 pixel circuit P21 may be connected to the second data line DL2, the 2-3 pixel circuit P23 may be connected to the third data line DL3 and the 2-4 pixel circuit P24 may be connected to the fourth data line DL4.

The display panel 100 may include a 1-1 light emitting area B11, a 1-2 light emitting area G11, a 1-3 light emitting area R11 and a 1-4 light emitting area G12 sequentially disposed in the first direction D1.

The display panel 100 may further include a 2-1 light emitting area R21, a 2-2 light emitting area G21, a 2-3 light emitting area B21 and a 2-4 light emitting area G22 sequentially disposed in the first direction D1 and adjacent to the 1-1 to 1-4 light emitting areas B11, G11, R11 and G12 in the second direction D2.

In the present embodiment, the 1-1 pixel circuit P11 may be connected to the 1-2 light emitting area G11, the 1-2 pixel circuit P12 may be connected to the 1-1 light emitting area B11, the 1-3 pixel circuit P13 may be connected to the 1-3 light emitting area R11 and the 1-4 pixel circuit P14 may be connected to the 1-4 light emitting area G12.

In the present embodiment, the 2-1 pixel circuit P21 may be connected to the 2-2 light emitting area G21, the 2-2 pixel circuit P22 may be connected to the 2-3 light emitting area B21, the 2-3 pixel circuit P23 may be connected to the 2-1 light emitting area R21 and the 2-4 pixel circuit P24 may be connected to the 2-4 light emitting area G22.

The 1-1 light emitting area B11 may be a first blue light emitting area, the 1-2 light emitting area G11 may be a 1-1 green light emitting area, the 1-3 light emitting area R11 may be a first red light emitting area and the 1-4 light emitting area G12 may be a 1-2 green light emitting area.

In addition, the 2-1 light emitting area R21 may be a second red light emitting area, the 2-2 light emitting area G21 may be a 2-1 green light emitting area, the 2-3 light emitting area B21 may be a second blue light emitting area and the 2-4 light emitting area G22 may be a 2-2 green light emitting area.

The 1-1 pixel circuit P11 and the 2-1 pixel circuit P21 connected to the first data line DL1 are connected to the 1-2 light emitting area G11 and the 2-2 light emitting area G21 which are the green light emitting areas so that a first green data voltage may be applied to the first data line DL1.

The 1-2 pixel circuit P12 and the 2-2 pixel circuit P22 connected to the second data line DL2 are connected to the 1-1 light emitting area B11 and the 2-3 light emitting area B21 which are the blue light emitting areas so that a blue data voltage may be applied to the second data line DL2.

The 1-3 pixel circuit P13 and the 2-3 pixel circuit P23 connected to the third data line DL3 are connected to the 1-3 light emitting area R11 and the 2-1 light emitting area R21 which are the red light emitting areas so that a red data voltage may be applied to the third data line DL3.

The 1-4 pixel circuit P14 and the 2-4 pixel circuit P24 connected to the fourth data line DL4 are connected to the 1-4 light emitting area G12 and the 2-4 light emitting area G22 which are the green light emitting areas so that a second green data voltage may be applied to the fourth data line DL4.

In the display panel 100 in which the red light emitting area and the blue light emitting area are alternately disposed, one data line (e.g. each of the second data line DL2 and the third data line DL3) outputs the data voltage of only one color without toggling the red data voltage and the blue data voltage so that the power consumption of the display apparatus may be reduced.

In the present embodiment, the 1-2 light emitting area G11 and the 1-4 light emitting area G12 are disposed adjacent to each other in the first direction D1 in a 1-1 row and the 1-1 light emitting area B11 and the 1-3 light emitting area R11 are disposed adjacent to each other in the first direction D1 in a 1-2 row. Herein, the 1-2 row may be disposed under the 1-1 row in the second direction D2. The 1-2 row may be disposed adjacent to the 1-1 row in the second direction D2. The light emitting areas G11 and G12 in the 1-1 row and the light emitting areas B11 and R11 in the 1-2 row may correspond to one pixel row (the first pixel row). The light emitting areas G11 and G12 in the 1-1 row and the light emitting areas B11 and R11 in the 1-2 row may form a first light emitting row corresponding to one pixel row (the first pixel row).

In the present embodiment, the display panel may include a repetitive unit structure including eight pixel circuits in two rows and four columns and eight light emitting areas corresponding to the eight pixel circuits. For example, a unit structure including the pixel circuits P11, P12, P13 and P14 in the first pixel row, the pixel circuits P21, P22, P23 and P24 in the second pixel row and the light emitting areas B11, G11, R11, G12, R21, G21, B21 and G22 corresponding to the pixel circuits P11, P12, P13, P14, P21, P22, P23 and P24 may be disposed repetitively along a row direction and a column direction.

According to the present embodiment, in the display panel 100 in which the red light emitting area R11, R21, R31 and R41 and the blue light emitting area B11, B21, B31 and B41 are alternately disposed, one data line (e.g. one of DL2 and DL3) outputs a data voltage of only one color (e.g. one of red and blue) without toggling the red data voltage and the blue data voltage so that the power consumption of the display apparatus may be reduced.

In the present embodiment, the 1-2 pixel circuit P12 may be connected to the 1-1 light emitting area B11 and the 1-3 pixel circuit P13 may be connected to the 1-3 light emitting area R11. The 1-2 pixel circuit P12 may be connected to the 1-1 light emitting area R11 through a 1-2 contact portion C12 and a 1-2 connecting line L12. The 1-3 pixel circuit P13 may be connected to the 1-3 light emitting area B11 through a 1-3 contact portion C13 and a 1-3 connecting line L13.

In the present embodiment, the 2-2 pixel circuit P22 may be connected to the 2-3 light emitting area B21 and the 2-3 pixel circuit P23 may be connected to the 2-1 light emitting area R21. The 2-2 pixel circuit P22 may be connected to the 2-3 light emitting area B21 through a 2-2 contact portion C22 and a 2-2 connecting line L22. The 2-3 pixel circuit P23 may be connected to the 2-1 light emitting area R21 through a 2-3 contact portion C23 and a 2-3 connecting line L23.

The conventional display panel structure to prevent toggling of the red data voltage and the blue data voltage may include additional data lines. In contrast, the display panel structure of the present inventive concept may not include the additional data lines and may have a cross connection (e.g. L22, L23, L42 and L43) between the pixel circuit and the light emitting area which are spaced apart from each other so that the power consumption may not occur for driving the additional data lines and the dead space may be reduced.

Figure 16:
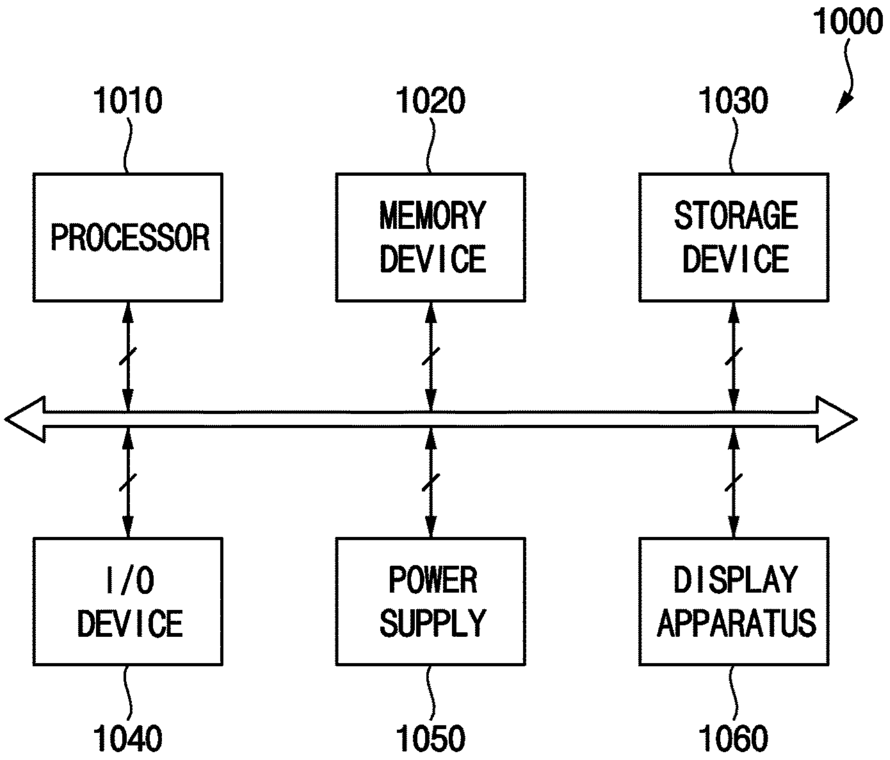
FIG. 16 is a block diagram illustrating an electronic apparatus according to an embodiment of the present inventive concept.
Figure 17:
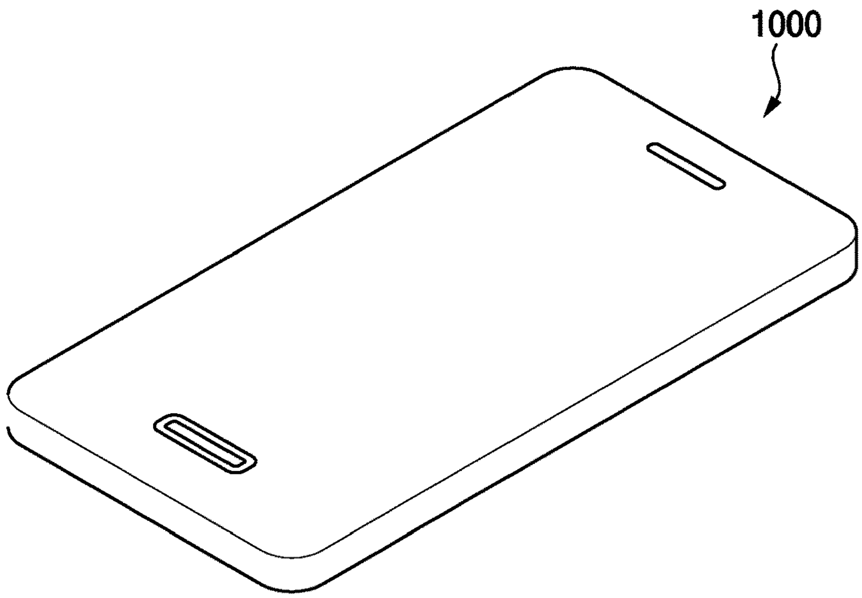
FIG. 17 is a diagram illustrating an example in which the electronic apparatus of FIG. 16 is implemented as a smart phone.

FIG. 16 is a block diagram illustrating an electronic apparatus 1000 according to an embodiment of the present inventive concept. FIG. 17 is a diagram illustrating an example in which the electronic apparatus 1000 of FIG. 16 is implemented as a smart phone.

Referring to FIGS. 16 and 17, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 17, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Figure 18:
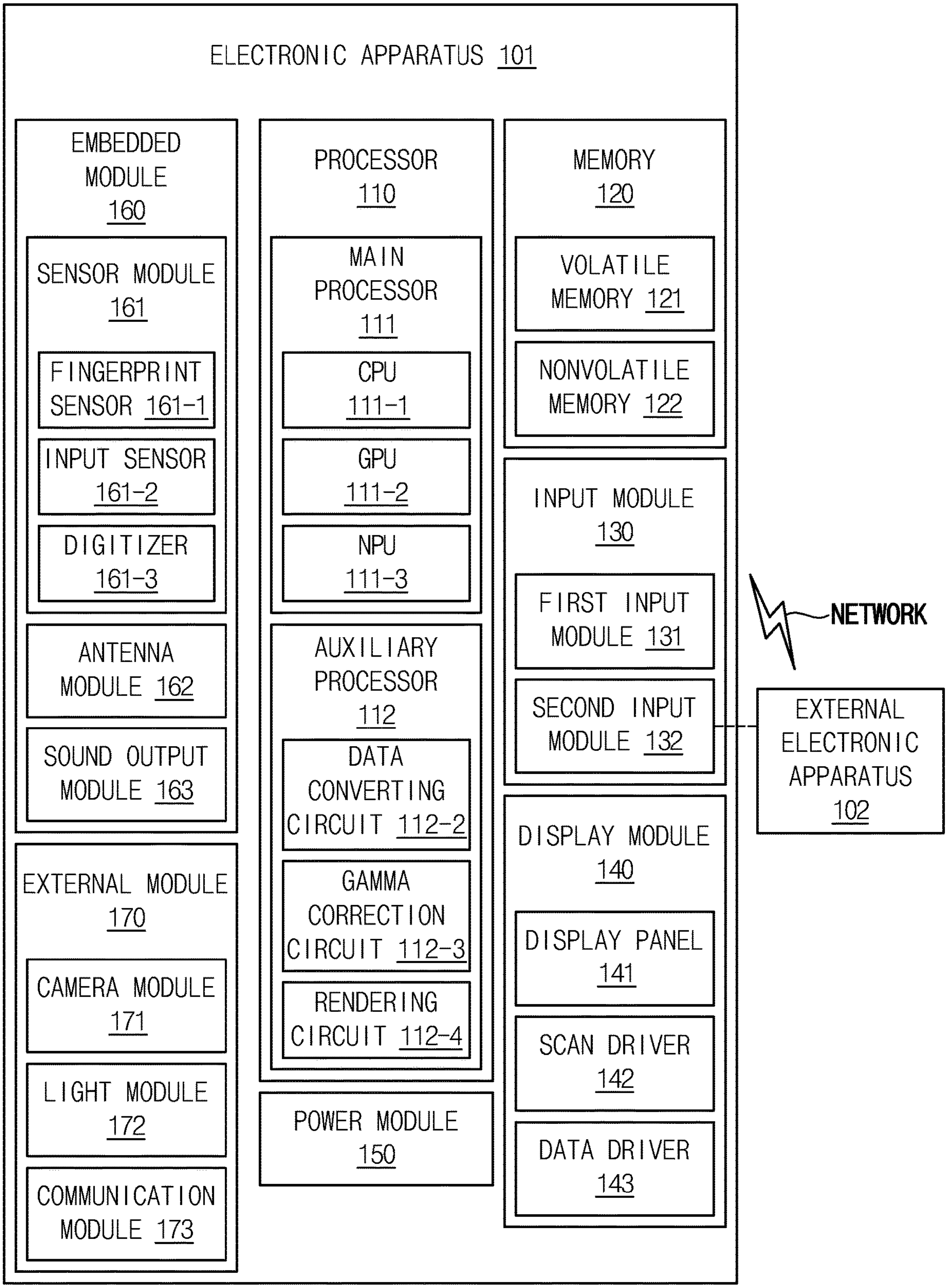
FIG. 18 is a block diagram illustrating an electronic apparatus according to an embodiment of the present inventive concept.

FIG. 18 is a block diagram illustrating an electronic apparatus 101 according to an embodiment of the present inventive concept.

Referring to FIGS. 1 to 18, an electronic apparatus 101 outputs various information through a display module 140 in an operating system. When a processor 110 executes an application stored in a memory 120, the display module 140 provides application information to a user through a display panel 141.

The processor 110 obtains an external input through an input module 130 or a sensor module 161 and executes an application corresponding to the external input. For example, when the user selects a camera icon displayed on the display panel 141, the processor 110 obtains a user input through an input sensor 161-2 and activates a camera module 171. The processor 110 transfers image data corresponding to a captured image obtained through the camera module 171 to the display module 140. The display module 140 may display an image corresponding to the captured image through the display panel 141.

In an embodiment, when a personal information authentication is executed in the display module 140, a fingerprint sensor 161-1 obtains input fingerprint information as input data. The processor 110 compares input data obtained through the fingerprint sensor 161-1 with authentication data stored in the memory 120, and executes an application according to a comparison result. The display module 140 may display information executed according to application logic through the display panel 141.

In an embodiment, when a music streaming icon displayed on the display module 140 is selected, the processor 110 obtains a user input through the input sensor 161-2 and activates a music streaming application stored in the memory 120. When a music execution command is input in the music streaming application, the processor 110 activates a sound output module 163 to provide sound information corresponding to the music execution command to the user.

In the above, the operation of the electronic apparatus 101 is briefly described. Hereinafter, a configuration of the electronic apparatus 101 is described in detail. Some of elements of the electronic apparatus 101 described later may be integrated and provided as one element, or one element may be separated as two or more elements.

The electronic apparatus 101 may communicate with an external electronic apparatus 102 through a network (e.g. a short-range wireless communication network or a long-range wireless communication network). According to an embodiment, the electronic apparatus 101 may include the processor 110, the memory 120, the input module 130, the display module 140, a power module 150, an embedded module 160, and an external module 170. According to an embodiment, in the electronic apparatus 101, at least one of the above-described elements may be omitted or one or more other apparatus may be added. According to an embodiment, some of the above-described elements (e.g., the sensor module 161, an antenna module 162 or the sound output module 163) may be integrated into another element (e.g. the display module 140).

The processor 110 may execute software to control at least one other element (e.g. hardware or software element) of the electronic apparatus 101 connected to the processor 110 and to perform various data processing or operations. According to an embodiment, as at least part of the data processing or the operations, the processor 110 may store receive instructions or data from other elements (e.g. the input module 130, the sensor module 161 or a communication module 173) in a volatile memory 121, may process the instructions or data stored in the volatile memory 121 and may store result data of the processing in a nonvolatile memory 122.

The processor 110 may include a main processor 111 and an auxiliary processor 112. The main processor 111 may include at least one of a central processing unit (CPU) 111-1 and an application processor (AP). The main processor 111 may further include any one or more of a graphic processing unit (GPU) 111-2, a communication processor (CP) and an image signal processor (ISP). The main processor 111 may further include a neural processing unit (NPU) 111-3. The neural network processing unit 111-3 is a processor specialized in processing an artificial intelligence model. The artificial intelligence model may be generated through a machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN) and a deep Q-networks or a combination of two or more of the above. However, the artificial neural network is not limited to the above examples. The artificial intelligence model may include software structures, in addition to hardware structures or instead of the hardware structures. At least two of the above-described processing units and the above-described processors may be implemented as an integrated element (e.g. a single chip) or each may be implemented as independent elements (e.g. in a plurality of chips).

The auxiliary processor 112 may include a controller. The controller may include an interface conversion circuit and a timing control circuit. The controller receives an image signal from the main processor 111, converts a data format of the image signal to meet interface specifications with the display module 140, and outputs image data. The controller may output various control signals for driving the display module 140.

The auxiliary processor 112 may further include a data converting circuit 112-2, a gamma correction circuit 112-3 and a rendering circuit 112-4. The data converting circuit 112-2 may receive the image data from the controller and may compensate the image data such that the image is displayed with a desired luminance according to characteristics of the electronic apparatus 101 or a user setting or may convert the image data to reduce a power consumption or compensate for afterimages. The gamma correction circuit 112-3 may convert the image data or a gamma reference voltage such that the image displayed on the electronic apparatus 101 has desired gamma characteristics. The rendering circuit 112-4 may receive the image data from the controller and may render the image data based on a pixel arrangement of the display panel 141 included in the electronic apparatus 101. At least one of the data converting circuit 112-2, the gamma correction circuit 112-3 and the rendering circuit 112-4 may be integrated into another element (e.g. the main processor 111 or the controller). At least one of the data converting circuit 112-2, the gamma correction circuit 112-3 and the rendering circuit 112-4 may be integrated into a data driver 143 to be described later.

The memory 120 may store various data used by at least one element (e.g. the processor 110 or the sensor module 161) of the electronic apparatus 101 and input data or output data for commands related thereto. The memory 120 may include at least one of the volatile memory 121 and the nonvolatile memory 122.

The input module 130 may receive commands or data used to the elements (e.g. the processor 110, the sensor module 161 or the sound output module 163) of the electronic apparatus 101 from the outside of the electronic apparatus 101 (e.g. the user or the external electronic apparatus 102).

The input module 130 may include a first input module 131 for receiving commands or data from the user and a second input module 132 for receiving commands or data from the external electronic apparatus 102. The first input module 131 may include a microphone, a mouse, a keyboard, a key (e.g. a button) or a pen (e.g. a passive pen or an active pen). The second input module 132 may support a designated protocol capable of connecting to the external electronic apparatus 102 by wire or wirelessly. According to an embodiment, the second input module 132 may include a high definition multimedia interface (HDMI), a universal serial bus (USB) interface, an SD card interface or an audio interface. The second input module 132 may include a connector physically connected to the external electronic apparatus 102, for example, an HDMI connector, a USB connector, an SD card connector, or an audio connector (e.g. a headphone connector).

The display module 140 visually provides information to the user. The display module 140 may include the display panel 141, a scan driver 142 and the data driver 143. The display module 140 may further include a window, a chassis and a bracket to protect the display panel 141.

The display panel 141 may include a liquid crystal display panel, an organic light emitting display panel or an inorganic light emitting display panel. A type of the display panel 141 is not particularly limited. The display panel 141 may be a rigid type or a flexible type capable of being rolled or folded. The display module 140 may further include a supporter or a heat dissipation member supporting the display panel 141.

The scan driver 142 may be mounted on the display panel 141 as a driving chip. Alternatively, the scan driver 142 may be integrated on the display panel 141. For example, the scan driver 142 may include an amorphous silicon TFT gate driver circuit (ASG) integrated on the display panel 141, a low temperature polycrystaline silicon (LTPS) TFT gate driver circuit integrated on the display panel 141, or an oxide semiconductor TFT gate driver circuit (OSG) integrated on the display panel 141. The scan driver 142 receives a control signal from the controller and outputs the scan signals to the display panel 141 in response to the control signal.

The display module 140 may further include a light emission driver. The light emission driver outputs a light emission control signal to the display panel 141 in response to a control signal received from the controller. The light emission driver may be formed independently from the scan driver 142. Alternatively, the light emission driver and the scan driver 142 may be integrally formed.

The data driver 143 receives a control signal from the controller and converts the image data into an analog voltage (e.g. the data voltage) and output the data voltages to the display panel 141 in response to the control signal.

The data driver 143 may be integrated into another element (e.g. the controller). The functions of the interface conversion circuit and the timing control circuit of the controller described above may be integrated into the data driver 143.

The display module 140 may further include a voltage generating circuit. The voltage generating circuit may output various voltages for driving the display panel 141.

The power module 150 supplies power to elements of the electronic apparatus 101. The power module 150 may include a battery which supplies a power voltage. The battery may include a non-rechargeable primary cell, a rechargeable secondary cell or a fuel cell. The power module 150 may include a power management integrated circuit (PMIC). The PMIC supplies optimized power to each of the above-described modules and modules described later. The power module 150 may include a wireless power transmission/reception member electrically connected to the battery. The wireless power transmission/reception member may include a plurality of antenna radiators in a form of coils.

The electronic apparatus 101 may further include the embedded module 160 and the external module 170. The embedded module 160 may include the sensor module 161, the antenna module 162 and the sound output module 163. The external module 170 may include the camera module 171, a light module 172 and the communication module 173.

The sensor module 161 may detect an input by a user's body or an input by the pen among the first input module 131, and generate an electrical signal or data value corresponding to the input. The sensor module 161 may include at least one of the fingerprint sensor 161-1, the input sensor 161-2 and a digitizer 161-3.

The fingerprint sensor 161-1 may generate a data value corresponding to a user's fingerprint. The fingerprint sensor 161-1 may include one of an optical fingerprint sensor or a capacitive fingerprint sensor.

The input sensor 161-2 may generate data values corresponding to coordinate information of the input by the user's body or the input by the pen. The input sensor 161-2 generates a capacitance change due to an input as a data value. The input sensor 161-2 may detect an input by the passive pen or transmit/receive data to/from the active pen.

The input sensor 161-2 may measure biosignals such as a blood pressure, a moisture, or a body fat. For example, when a user touches a part of his body to a sensor layer or a sensing panel and does not move for a certain period of time, the input sensor 161-2 may detect the biosignal based on a change in an electric field caused by the part of the body so that the display module 140 may output user's desired information.

The digitizer 161-3 may generate a data value corresponding to the coordinate information input by the pen. The digitizer 161-3 generates an amount of electromagnetic change by the input as a data value. The digitizer 161-3 may detect an input by the passive pen or transmit/receive data to/from the active pen.

At least one of the fingerprint sensor 161-1, the input sensor 161-2 and the digitizer 161-3 may be formed as a sensor layer on the display panel 141 through a continuous process. The fingerprint sensor 161-1, the input sensor 161-2 and the digitizer 161-3 may be disposed on the display panel 141. At least one of the fingerprint sensor 161-1, the input sensor 161-2 and the digitizer 161-3, for example, the digitizer 161-3, may be disposed under the display panel 141.

At least two or more of the fingerprint sensor 161-1, the input sensor 161-2 and the digitizer 161-3 may be integrated into the sensing panel through the same process. When at least two or more of the fingerprint sensor 161-1, the input sensor 161-2 and the digitizer 161-3 are integrated into the sensing panel, the sensing panel may be disposed between the display panel 141 and a window disposed over an upper surface of the display panel 141. According to an embodiment, the sensing panel may be disposed on the window. The present inventive concept may not be limited to a position of the sensing panel.

At least one of the fingerprint sensor 161-1, the input sensor 161-2 and the digitizer 161-3 may be embedded in the display panel 141. For example, at least one of the fingerprint sensor 161-1, the input sensor 161-2 and the digitizer 161-3 is formed simultaneously with the display panel 141 through a process of forming elements included in the display panel 141 (e.g. light emitting elements, transistors, etc.).

In addition, the sensor module 161 may generate an electrical signal or a data value corresponding to an internal state or an external state of the electronic apparatus 101. For example, the sensor module 161 may further include a gesture sensor, a gyro sensor, a barometric pressure sensor, a magnetic sensor, an acceleration sensor, a grip sensor, a proximity sensor, a color sensor, an IR (infrared) sensor, a biosensor, a temperature sensor, a humidity sensor or an illuminance sensor.

The antenna module 162 may include one or more antennas for transmitting a signal or power to outside or receiving a signal or power from outside. According to an embodiment, the communication module 173 may transmit a signal to an external electronic apparatus or receive a signal from an external electronic apparatus through an antenna suitable for a communication method. An antenna pattern of the antenna module 162 may be integrated with an element of the display module 140 (e.g. the display panel 141) or the input sensor 161-2.

The sound output module 163 is a device for outputting sound signals to the outside of the electronic apparatus 101. For example, the sound output module 163 may include a speaker used for general purposes such as playing multimedia or recording and a receiver used exclusively for receiving a call. According to an embodiment, the receiver may be formed integrally with or separately from the speaker. A sound output pattern of the sound output module 163 may be integrated with the display module 140.

The camera module 171 may capture still images and moving images. According to an embodiment, the camera module 171 may include one or more lenses, an image sensor or an image signal processor. The camera module 171 may further include an infrared camera capable of determining a presence or an absence of a user, the user's location and the user's gaze.

The light module 172 may provide a light. The light module 172 may include a light emitting diode or a xenon lamp. The light module 172 may operate in conjunction with the camera module 171 or operate independently.

The communication module 173 may support establishment of a wired or wireless communication channel between the electronic apparatus 101 and the external electronic apparatus 102 and communication through the established communication channel. The communication module 173 may include one or both of a wireless communication module such as a cellular communication module, a short-distance wireless communication module, or a global navigation satellite system (GNSS) communication module and a wired communication module such as a local area network (LAN) communication module, or a power line communication module. The communication module 173 may communicate with the external electronic apparatus 102 through a short-range communication network such as Bluetooth, WiFi direct or infrared data association (IrDA) or a long-distance communication network such as a cellular network, the Internet, or a computer network (e.g. LAN or WAN). The various types of communication modules 173 described above may be implemented as a single chip or may be implemented as separate chips.

The input module 130, the sensor module 161 and the camera module 171 may be used to control the operation of the display module 140 in conjunction with the processor 110.

The processor 110 outputs commands or data to the display module 140, the sound output module 163, the camera module 171 or the light module 172 based on the input data received from the input module 130. For example, the processor 110 may generate image data corresponding to input data applied through a mouse or an active pen, and output the generated image data to the display module 140 or the processor 110 may generate command data corresponding to the input data and output the generated command data to the camera module 171 or the light module 172. When input data is not received from the input module 130 for a certain period of time, the processor 110 converts an operation mode of the electronic apparatus 101 into a low power mode or a sleep mode so that a power consumption of the electronic apparatus 101 may be reduced.

The processor 110 outputs commands or data to the display module 140, the sound output module 163, the camera module 171 or the light module 172 based on sensed data received from the sensor module 161. For example, the processor 110 may compare authentication data applied by the fingerprint sensor 161-1 with authentication data stored in the memory 120, and then execute an application according to the comparison result. The processor 110 may execute commands or output corresponding image data to the display module 140 based on the sensed data sensed by the input sensor 161-2 or the digitizer 161-3. When the sensor module 161 includes a temperature sensor, the processor 110 may receive temperature data for the temperature measured from the sensor module 161 and may further perform luminance correction on the image data based on the temperature data.

The processor 110 may receive determined data about the presence or the absence of the user, the user's location and the user's gaze from the camera module 171. The processor 110 may further perform luminance correction on the image data based on the determined data. For example, the processor 110, which determines the presence or the absence of the user through an input from the camera module 171, may display image data having the luminance corrected by the data converting circuit 112-2 or the gamma correction circuit 112-3 to the display module 140.

Some of the above elements may be connected to each other through a communication method between peripheral devices such as a bus, a general purpose input/output (GPIO), a serial peripheral interface (SPI), a mobile industry processor interface (MIPI), or a ultra path interconnect (UPI) link to exchange signals (e.g. commands or data) with each other. The processor 110 may communicate with the display module 140 through an agreed interface. For example, the processor 110 may communicate with the display module 140 through any one of the above communication methods. The present invention may not be limited to the above communication methods.

The electronic apparatus 101 according to various embodiments disclosed in the disclosure may be various types of apparatuses. For example, the electronic apparatus 101 may include at least one of a portable communication apparatus (e.g. a smart phone), a computer apparatus, a portable multimedia apparatus, a portable medical apparatus, a camera, a wearable device and a home appliance. The electronic apparatus 101 according to the embodiment of the disclosure may not be limited to the aforementioned apparatuses.

For example, the display panel 100 of FIG. 1 may correspond to the display panel 141 of FIG. 18. For example, the driving controller 200 of FIG. 1 may correspond to the controller of the auxiliary processor 112 of FIG. 18. For example, the gate driver 300 of FIG. 1 may correspond to the scan driver 142 of FIG. 18. For example, the data driver 500 of FIG. 1 may correspond to the data driver 143 of FIG. 18.

According to the embodiments of the display panel, the power consumption of the display apparatus may be reduced and the dead space of the display apparatus may be reduced.

The foregoing is illustrative of the present inventive concept and is not to be construed as limiting thereof. Although embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display panel comprising:

a 2-1 pixel circuit, a 2-2 pixel circuit, a 2-3 pixel circuit and a 2-4 pixel circuit sequentially disposed in a first direction in a second pixel row; and a 2-1 light emitting area, a 2-2 light emitting area, a 2-3 light emitting area and a 2-4 light emitting area sequentially disposed in the first direction, wherein the 2-1 pixel circuit is connected to a first data line, the 2-2 pixel circuit is connected to a second data line, the 2-3 pixel circuit is connected to a third data line and the 2-4 pixel circuit is connected to a fourth data line, wherein the 2-1 pixel circuit is connected to the 2-3 light emitting area, the 2-2 pixel circuit is connected to the 2-1 light emitting area, the 2-3 pixel circuit is connected to the 2-2 light emitting area and the 2-4 pixel circuit is connected to the 2-4 light emitting area, and wherein a color of the 2-1 light emitting area is different from a color of the 2-3 light emitting area.

2. The display panel of claim 1, further comprising:

a 1-1 pixel circuit, a 1-2 pixel circuit, a 1-3 pixel circuit and a 1-4 pixel circuit sequentially disposed in the first direction in a first pixel row; and a 1-1 light emitting area, a 1-2 light emitting area, a 1-3 light emitting area and a 1-4 light emitting area sequentially disposed in the first direction, wherein the 1-1 pixel circuit is connected to the first data line, the 1-2 pixel circuit is connected to the second data line, the 1-3 pixel circuit is connected to the third data line and the 1-4 pixel circuit is connected to the fourth data line, wherein the 1-1 pixel circuit is connected to the 1-1 light emitting area, the 1-2 pixel circuit is connected to the 1-3 light emitting area, the 1-3 pixel circuit is connected to the 1-2 light emitting area and the 1-4 pixel circuit is connected to the 1-4 light emitting area, and wherein the second pixel row is adjacent to the first pixel row in a second direction.

3. The display panel of claim 2, wherein the 1-1 light emitting area is a first red light emitting area, the 1-2 light emitting area is a 1-1 green light emitting area, the 1-3 light emitting area is a first blue light emitting area and the 1-4 light emitting area is a 1-2 green light emitting area, and wherein the 2-1 light emitting area is a second blue light emitting area, the 2-2 light emitting area is a 2-1 green light emitting area, the 2-3 light emitting area is a second red light emitting area and the 2-4 light emitting area is a 2-2 green light emitting area.

4. The display panel of claim 3, wherein a red data voltage is applied to the first data line, a blue data voltage is applied to the second data line, a first green data voltage is applied to the third data line and a second green data voltage is applied to the fourth data line.

5. The display panel of claim 2, wherein the 1-1 light emitting area is a first blue light emitting area, the 1-2 light emitting area is a 1-1 green light emitting area, the 1-3 light emitting area is a first red light emitting area and the 1-4 light emitting area is a 1-2 green light emitting area, and wherein the 2-1 light emitting area is a second red light emitting area, the 2-2 light emitting area is a 2-1 green light emitting area, the 2-3 light emitting area is a second blue light emitting area and the 2-4 light emitting area is a 2-2 green light emitting area.

6. The display panel of claim 5, wherein a blue data voltage is applied to the first data line, a red data voltage is applied to the second data line, a first green data voltage is applied to the third data line and a second green data voltage is applied to the fourth data line.

7. The display panel of claim 2, wherein the 1-2 light emitting area and the 1-4 light emitting area are disposed adjacent to each other in a 1-1 row in the first direction, wherein the 1-1 light emitting area and the 1-3 light emitting area are disposed adjacent to each other in a 1-2 row in the first direction, and wherein the 1-2 row is disposed under the 1-1 row in the second direction.

8. The display panel of claim 7, wherein the 1-1 light emitting area includes a first portion overlapping the 1-1 pixel circuit and a second portion not overlapping the 1-1 pixel circuit, and wherein the 1-3 light emitting area includes a first portion overlapping the 1-3 pixel circuit and a second portion overlapping the 1-2 pixel circuit.

9. The display panel of claim 7, wherein the 1-2 light emitting area includes a first portion overlapping the 1-1 pixel circuit, a second portion overlapping the 1-2 pixel circuit and a third portion not overlapping the 1-1 pixel circuit and the 1-2 pixel circuit, and wherein the 1-4 light emitting area includes a first portion overlapping the 1-3 pixel circuit, a second portion overlapping the 1-4 pixel circuit and a third portion not overlapping the 1-3 pixel circuit and the 1-4 pixel circuit.

10. The display panel of claim 9, wherein a 1-3 connecting line connecting the 1-3 pixel circuit and the 1-2 light emitting area includes a first portion overlapping the 1-2 pixel circuit and a second portion overlapping the 1-3 pixel circuit.

11. The display panel of claim 7, wherein the 2-1 light emitting area includes a first portion overlapping the 2-1 pixel circuit and a second portion not overlapping the 2-1 pixel circuit, and wherein the 2-3 light emitting area includes a first portion overlapping the 2-3 pixel circuit and a second portion overlapping the 2-2 pixel circuit.

12. The display panel of claim 11, wherein a 2-2 connecting line connecting the 2-2 pixel circuit and the 2-1 light emitting area includes a first portion overlapping the 2-1 pixel circuit and a second portion overlapping the 2-2 pixel circuit.

13. The display panel of claim 12, wherein a 2-1 connecting line connecting the 2-1 pixel circuit and the 2-3 light emitting area includes a first portion overlapping the 2-1 pixel circuit and a second portion overlapping the 2-2 pixel circuit.

14. The display panel of claim 7, wherein the 2-2 light emitting area includes a first portion overlapping the 2-1 pixel circuit, a second portion overlapping the 2-2 pixel circuit, a third portion overlapping the 1-1 pixel circuit and a fourth portion overlapping the 1-2 pixel circuit, and wherein the 2-4 light emitting area includes a first portion overlapping the 2-3 pixel circuit, a second portion overlapping the 2-4 pixel circuit, a third portion overlapping the 1-3 pixel circuit and a fourth portion overlapping the 1-4 pixel circuit.

15. The display panel of claim 14, wherein a 2-3 connecting line connecting the 2-3 pixel circuit and the 2-2 light emitting area includes a first portion overlapping the 2-2 pixel circuit and a second portion overlapping the 2-3 pixel circuit.

16. The display panel of claim 2, wherein the 1-1 light emitting area and the 1-3 light emitting area are disposed adjacent to each other in a 1-1 row in the first direction, wherein the 1-2 light emitting area and the 1-4 light emitting area are disposed adjacent to each other in a 1-2 row in the first direction, and wherein the 1-2 row is disposed under the 1-1 row in the second direction.

17. The display panel of claim 16, wherein the 1-1 light emitting area includes a first portion overlapping the 1-1 pixel circuit and a second portion not overlapping the 1-1 pixel circuit, and wherein the 1-3 light emitting area includes a first portion overlapping the 1-2 pixel circuit, a second portion overlapping the 1-3 pixel circuit and a third portion not overlapping the 1-2 pixel circuit and the 1-3 pixel circuit.

18. The display panel of claim 16, wherein the 1-2 light emitting area includes a first portion overlapping the 1-1 pixel circuit and a second portion overlapping the 1-2 pixel circuit, and wherein the 1-4 light emitting area includes a first portion overlapping the 1-3 pixel circuit and a second portion overlapping the 1-4 pixel circuit.

19. The display panel of claim 16, wherein the 2-1 light emitting area includes a first portion overlapping the 2-1 pixel circuit, a second portion overlapping the 1-1 pixel circuit, a third portion not overlapping the 2-1 pixel circuit and the 1-1 pixel circuit, and wherein the 2-3 light emitting area includes a first portion overlapping the 2-2 pixel circuit, a second portion overlapping the 2-3 pixel circuit, a third portion overlapping the 1-2 pixel circuit and a fourth portion overlapping the 1-3 pixel circuit.

20. The display panel of claim 16, wherein the 2-2 light emitting area includes a first portion overlapping the 2-1 pixel circuit and a second portion overlapping the 2-2 pixel circuit, and wherein the 2-4 light emitting area includes a first portion overlapping the 2-3 pixel circuit and a second portion overlapping the 2-4 pixel circuit.

21. A display panel comprising:

a 2-1 pixel circuit, a 2-2 pixel circuit, a 2-3 pixel circuit and a 2-4 pixel circuit sequentially disposed in a first direction in a second pixel row; and a 2-1 light emitting area, a 2-2 light emitting area, a 2-3 light emitting area and a 2-4 light emitting area sequentially disposed in the first direction, wherein the 2-1 pixel circuit is connected to a first data line, the 2-2 pixel circuit is connected to a second data line, the 2-3 pixel circuit is connected to a third data line and the 2-4 pixel circuit is connected to a fourth data line, wherein the 2-1 pixel circuit is connected to the 2-2 light emitting area, the 2-2 pixel circuit is connected to the 2-3 light emitting area, the 2-3 pixel circuit is connected to the 2-4 light emitting area and the 2-4 pixel circuit is connected to the 2-1 light emitting area, and wherein a color of the 2-1 light emitting area is different from a color of the 2-3 light emitting area.

22. The display panel of claim 21, further comprising:

a 1-1 pixel circuit, a 1-2 pixel circuit, a 1-3 pixel circuit and a 1-4 pixel circuit sequentially disposed in the first direction in a first pixel row; and a 1-1 light emitting area, a 1-2 light emitting area, a 1-3 light emitting area and a 1-4 light emitting area sequentially disposed in the first direction, wherein the 1-1 pixel circuit is connected to the first data line, the 1-2 pixel circuit is connected to the second data line, the 1-3 pixel circuit is connected to the third data line and the 1-4 pixel circuit is connected to the fourth data line, wherein the 1-1 pixel circuit is connected to the 1-2 light emitting area, the 1-2 pixel circuit is connected to the 1-1 light emitting area, the 1-3 pixel circuit is connected to the 1-4 light emitting area and the 1-4 pixel circuit is connected to the 1-3 light emitting area, and wherein the second pixel row is adjacent to the first pixel row in a second direction.

23. The display panel of claim 22, wherein the 1-1 light emitting area is a first red light emitting area, the 1-2 light emitting area is a 1-1 green light emitting area, the 1-3 light emitting area is a first blue light emitting area and the 1-4 light emitting area is a 1-2 green light emitting area, and wherein the 2-1 light emitting area is a second blue light emitting area, the 2-2 light emitting area is a 2-1 green light emitting area, the 2-3 light emitting area is a second red light emitting area and the 2-4 light emitting area is a 2-2 green light emitting area.

24. The display panel of claim 23, wherein a first green data voltage is applied to the first data line, a red data voltage is applied to the second data line, a second green data voltage is applied to the third data line and a blue data voltage is applied to the fourth data line.

25. The display panel of claim 22, wherein the 1-1 light emitting area is a first blue light emitting area, the 1-2 light emitting area is a 1-1 green light emitting area, the 1-3 light emitting area is a first red light emitting area and the 1-4 light emitting area is a 1-2 green light emitting area, and wherein the 2-1 light emitting area is a second red light emitting area, the 2-2 light emitting area is a 2-1 green light emitting area, the 2-3 light emitting area is a second blue light emitting area and the 2-4 light emitting area is a 2-2 green light emitting area.

26. The display panel of claim 25, wherein a first green data voltage is applied to the first data line, a blue data voltage is applied to the second data line, a second green data voltage is applied to the third data line and a red data voltage is applied to the fourth data line.

27. The display panel of claim 22, wherein the 1-2 light emitting area and the 1-4 light emitting area are disposed adjacent to each other in a 1-1 row in the first direction, wherein the 1-1 light emitting area and the 1-3 light emitting area are disposed adjacent to each other in a 1-2 row in the first direction, and wherein the 1-2 row is disposed under the 1-1 row in the second direction.

28. A display panel comprising:

a 2-1 pixel circuit, a 2-2 pixel circuit, a 2-3 pixel circuit and a 2-4 pixel circuit sequentially disposed in a first direction in a second pixel row; and a 2-1 light emitting area, a 2-2 light emitting area, a 2-3 light emitting area and a 2-4 light emitting area sequentially disposed in the first direction, wherein the 2-1 pixel circuit is connected to a first data line, the 2-2 pixel circuit is connected to a second data line, the 2-3 pixel circuit is connected to a third data line and the 2-4 pixel circuit is connected to a fourth data line, wherein the 2-1 pixel circuit is connected to the 2-2 light emitting area, the 2-2 pixel circuit is connected to the 2-3 light emitting area, the 2-3 pixel circuit is connected to the 2-1 light emitting area and the 2-4 pixel circuit is connected to the 2-4 light emitting area, and wherein a color of the 2-1 light emitting area is different from a color of the 2-3 light emitting area.

29. The display panel of claim 28, further comprising:

a 1-1 pixel circuit, a 1-2 pixel circuit, a 1-3 pixel circuit and a 1-4 pixel circuit sequentially disposed in the first direction in a first pixel row; and a 1-1 light emitting area, a 1-2 light emitting area, a 1-3 light emitting area and a 1-4 light emitting area sequentially disposed in the first direction, wherein the 1-1 pixel circuit is connected to the first data line, the 1-2 pixel circuit is connected to the second data line, the 1-3 pixel circuit is connected to the third data line and the 1-4 pixel circuit is connected to the fourth data line, wherein the 1-1 pixel circuit is connected to the 1-2 light emitting area, the 1-2 pixel circuit is connected to the 1-1 light emitting area, the 1-3 pixel circuit is connected to the 1-3 light emitting area and the 1-4 pixel circuit is connected to the 1-4 light emitting area, and wherein the second pixel row is adjacent to the first pixel row in a second direction.

30. The display panel of claim 29, wherein the 1-1 light emitting area is a first red light emitting area, the 1-2 light emitting area is a 1-1 green light emitting area, the 1-3 light emitting area is a first blue light emitting area and the 1-4 light emitting area is a 1-2 green light emitting area, and wherein the 2-1 light emitting area is a second blue light emitting area, the 2-2 light emitting area is a 2-1 green light emitting area, the 2-3 light emitting area is a second red light emitting area and the 2-4 light emitting area is a 2-2 green light emitting area.

31. The display panel of claim 30, wherein a first green data voltage is applied to the first data line, a red data voltage is applied to the second data line, a blue data voltage is applied to the third data line and a second green data voltage is applied to the fourth data line.

32. The display panel of claim 29, wherein the 1-1 light emitting area is a first blue light emitting area, the 1-2 light emitting area is a 1-1 green light emitting area, the 1-3 light emitting area is a first red light emitting area and the 1-4 light emitting area is a 1-2 green light emitting area, and wherein the 2-1 light emitting area is a second red light emitting area, the 2-2 light emitting area is a 2-1 green light emitting area, the 2-3 light emitting area is a second blue light emitting area and the 2-4 light emitting area is a 2-2 green light emitting area.

33. The display panel of claim 32, wherein a first green data voltage is applied to the first data line, a blue data voltage is applied to the second data line, a red data voltage is applied to the third data line and a second green data voltage is applied to the fourth data line.

34. The display panel of claim 29, wherein the 1-2 light emitting area and the 1-4 light emitting area are disposed adjacent to each other in a 1-1 row in the first direction, wherein the 1-1 light emitting area and the 1-3 light emitting area are disposed adjacent to each other in a 1-2 row in the first direction, and wherein the 1-2 row is disposed under the 1-1 row in the second direction.

35. A display panel comprising:

a first pixel circuit;

a second pixel circuit adjacent to the first pixel circuit in a first direction;

a third pixel circuit adjacent to the first pixel circuit in a second direction;

a fourth pixel circuit adjacent to the third pixel circuit in the first direction;

a first light emitting area overlapping the first pixel circuit and connected to the first pixel circuit;

a second light emitting area overlapping the second pixel circuit and connected to the second pixel circuit;

a third light emitting area overlapping the third pixel circuit and connected to the fourth pixel circuit; and a fourth light emitting area overlapping the fourth pixel circuit and connected to the third pixel circuit, wherein the first pixel circuit and the third pixel circuit are connected to a first data line and the second pixel circuit and the fourth pixel circuit are connected to a second data line, and wherein the first light emitting area and the fourth light emitting area represent a first color and the second light emitting area and the third light emitting area represent a second color different from the first color.

36. The display panel of claim 35, further comprising:

a fifth light emitting area disposed between the first light emitting area and the second light emitting area in the first direction; and a sixth light emitting area disposed between the third light emitting area and the fourth light emitting area in the first direction, wherein the fifth light emitting area and the sixth light emitting area represent a third color different from the first color and different from the second color.

* * * * *